(12) United States Patent
Bae et al.

(10) Patent No.: US 12,361,860 B2
(45) Date of Patent: Jul. 15, 2025

(54) OPERATION METHOD FOR GAMMA VOLTAGE ACCORDING TO DISPLAY AREA AND ELECTRONIC DEVICE SUPPORTING SAME

(71) Applicant: Samsung Electronics Co., Ltd., Suwon-si (KR)

(72) Inventors: Jongkon Bae, Suwon-si (KR); Jaesung Lee, Suwon-si (KR); Taewoong Lee, Suwon-si (KR); Donghwy Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 17/878,358

(22) Filed: Aug. 1, 2022

(65) Prior Publication Data

US 2022/0366832 A1 Nov. 17, 2022

Related U.S. Application Data

(63) Continuation of application No. PCT/KR2021/000540, filed on Jan. 14, 2021.

(30) Foreign Application Priority Data

Feb. 5, 2020 (KR) .................. 10-2020-0013978

(51) Int. Cl.
*G09G 3/20* (2006.01)
*G06V 40/13* (2022.01)
*H04N 9/69* (2023.01)

(52) U.S. Cl.
CPC ....... *G09G 3/2096* (2013.01); *G06V 40/1318* (2022.01); *G09G 3/2007* (2013.01);
(Continued)

(58) Field of Classification Search
CPC .. G09G 1/00; G09G 3/00; G09G 5/00; G09G 2310/0297; G09G 3/20; G09G 3/3275;
(Continued)

(56) References Cited

U.S. PATENT DOCUMENTS 9,966,042 B2  5/2018 Deng
10,157,590 B1  12/2018 Aflatooni et al.
(Continued)

FOREIGN PATENT DOCUMENTS

CN         108766347 A      11/2018
KR    10-2018-0002430 A      1/2018
(Continued)

OTHER PUBLICATIONS

Korean Office Action with English translation dated May 27, 2024; Korean Appln. No. 10-2020-0013978.

*Primary Examiner* — Michael A Faragalla
(74) *Attorney, Agent, or Firm* — Jefferson IP Law, LLP

(57) ABSTRACT

An operation method and an electronic device supporting the same are provided. The operation method includes receiving, by a display driver integrated circuit (IC), display data from a processor and supplying, by the display driver IC, a second gamma signal set to display a luminance of a second magnitude greater than a first magnitude to a second display area having a second pixel arrangement density lower than a first pixel arrangement density, while supplying a first gamma signal set to display a luminance of the first magnitude to a first display area disposed at the first pixel arrangement density in a display panel.

14 Claims, 16 Drawing Sheets

(52) U.S. Cl.
CPC ....... *H04N 9/69* (2013.01); *G09G 2300/0452* (2013.01); *G09G 2310/0243* (2013.01); *G09G 2310/0291* (2013.01); *G09G 2310/0297* (2013.01); *G09G 2310/08* (2013.01); *G09G 2320/0276* (2013.01); *G09G 2320/0626* (2013.01); *G09G 2320/0666* (2013.01); *G09G 2354/00* (2013.01)

(58) Field of Classification Search
CPC .......... G09G 3/3258; G09G 3/36; G09G 3/34; G06K 9/00; H01L 27/32
See application file for complete search history.

(56) References Cited

U.S. PATENT DOCUMENTS

| | | | |
|---|---|---|---|
| 10,467,985 B2 | 11/2019 | Aflatooni et al. | |
| 10,559,280 B2 | 2/2020 | Bae et al. | |
| 10,950,170 B2 | 3/2021 | Li | |
| 10,984,752 B2 | 4/2021 | Aflatooni et al. | |
| 10,990,842 B2 | 4/2021 | Kim et al. | |
| 11,335,229 B2 | 5/2022 | Bae et al. | |
| 2009/0201417 A1* | 8/2009 | Kasahara | H04N 7/012 |
| | | | 348/E7.003 |
| 2010/0026731 A1* | 2/2010 | Konuma | H04N 9/69 |
| | | | 345/690 |
| 2013/0194284 A1* | 8/2013 | Bi | H03M 1/682 |
| | | | 345/522 |
| 2017/0076694 A1* | 3/2017 | Shin | G09G 3/2003 |
| 2018/0025691 A1* | 1/2018 | Ota | G09G 3/3413 |
| | | | 345/96 |
| 2018/0040295 A1 | 2/2018 | Deng | |
| 2018/0204524 A1* | 7/2018 | Kucera | G09G 3/30 |
| 2018/0268780 A1 | 9/2018 | Bae et al. | |
| 2019/0228740 A1 | 7/2019 | Aflatooni et al. | |
| 2019/0326366 A1 | 10/2019 | Fan et al. | |
| 2019/0340984 A1* | 11/2019 | Zhao | G09G 3/3648 |
| 2020/0019804 A1 | 1/2020 | Kim et al. | |
| 2020/0066809 A1* | 2/2020 | Liu | H10K 59/352 |
| 2020/0152134 A1* | 5/2020 | Lee | G09G 3/20 |
| 2020/0234634 A1 | 7/2020 | Li | |
| 2020/0302865 A1* | 9/2020 | Lu | G09G 3/2003 |
| 2020/0388206 A1 | 12/2020 | Bae et al. | |
| 2021/0027745 A1* | 1/2021 | Bai | G09G 3/2096 |
| 2021/0065625 A1 | 3/2021 | Wang et al. | |
| 2022/0059011 A1 | 2/2022 | Li et al. | |

FOREIGN PATENT DOCUMENTS

| | | |
|---|---|---|
| KR | 10-2018-0092055 A | 8/2018 |
| KR | 10-2019-0074804 A | 6/2019 |
| WO | 2019/242352 A1 | 12/2019 |

* cited by examiner

OPERATION METHOD FOR GAMMA VOLTAGE ACCORDING TO DISPLAY AREA AND ELECTRONIC DEVICE SUPPORTING SAME

CROSS-REFERENCE TO RELATED APPLICATION(S)

This application is a continuation application, claiming priority under § 365(c), of an International application No. PCT/KR2021/000540, filed on Jan. 14, 2021, which is based on and claims the benefit of a Korean patent application number 10-2020-0013978, filed on Feb. 5, 2020, in the Korean Intellectual Property Office, the disclosure of which is incorporated by reference herein in its entirety.

BACKGROUND

1. Field

The disclosure relates to operation for a gamma voltage according to a display area.

2. Description of Related Art

An electronic device includes a display for displaying information. Recently, it has focused on ways to enlarge a display area. Thus, a method in which a camera or sensor disposed in the front is disposed in a lower portion of the display has been studied. However, when the camera is disposed in the lower portion of the display, the signal delivered to the camera may cause a loss, while passing through the display. Due to this, there is a problem in which the camera disposed in the lower portion of the display does not provide resolution with a certain magnitude or more. To address it, a method for making up a pixel arrangement density of the area in which the camera is disposed to be different from another area.

The above information is presented as background information only to assist with an understanding of the disclosure. No determination has been made, and no assertion is made, as to whether any of the above might be applicable as prior art with regard to the disclosure.

SUMMARY

When a pixel arrangement density of a display area in which a sensor such as a camera is disposed in a lower portion of the display is different from a pixel arrangement density of another area adjacent to the display area, there is a problem in which a visual difference occurs when displaying the same image.

Aspects of the disclosure are to address at least the above-mentioned problems and/or disadvantages and to provide at least the advantages described below. Accordingly, an aspect of the disclosure is to provide an operation method for a gamma voltage according to a display area to display the same or similar image although there are pixel arrangement densities by changing a gamma voltage applied according to a display area and an electronic device supporting the same.

Additional aspects will be set forth in part in the description which follows and, in part, will be apparent from the description, or may be learned by practice of the presented embodiments.

In accordance with an aspect of the disclosure, an electronic device is provided. The electronic device includes a display panel including a first display area and a second display area, the first display area including subpixels distributed at a first density and the second display area including subpixels distributed at a second density lower than the first density, and a display driver integrated circuit (IC) associated with driving the display panel. The display driver IC may include a gamma generator that supplies a gamma signal to source lines arranged in the first display area and an extra gamma generator that supplies a gamma signal to source lines arranged in the second display area and the first display area. The extra gamma generator may be configured to supply, to the second display area, a gamma signal set to have a relatively higher luminance value than a gamma signal supplied to the first display area.

In accordance with another aspect of the disclosure, an operation method for a gamma voltage according to a display area is provided. The operation method includes receiving, by a display driver IC, display data from a processor and supplying, by the display driver IC, a second gamma signal set to display a luminance of a second magnitude greater than a first magnitude to a second display area having a second pixel arrangement density lower than a first pixel arrangement density, while supplying a first gamma signal set to display a luminance of the first magnitude to a first display area disposed at the first pixel arrangement density in a display panel.

According to various embodiments of the disclosure, the various embodiments may suitably perform image display by selectively operating a gamma voltage depending on a display area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
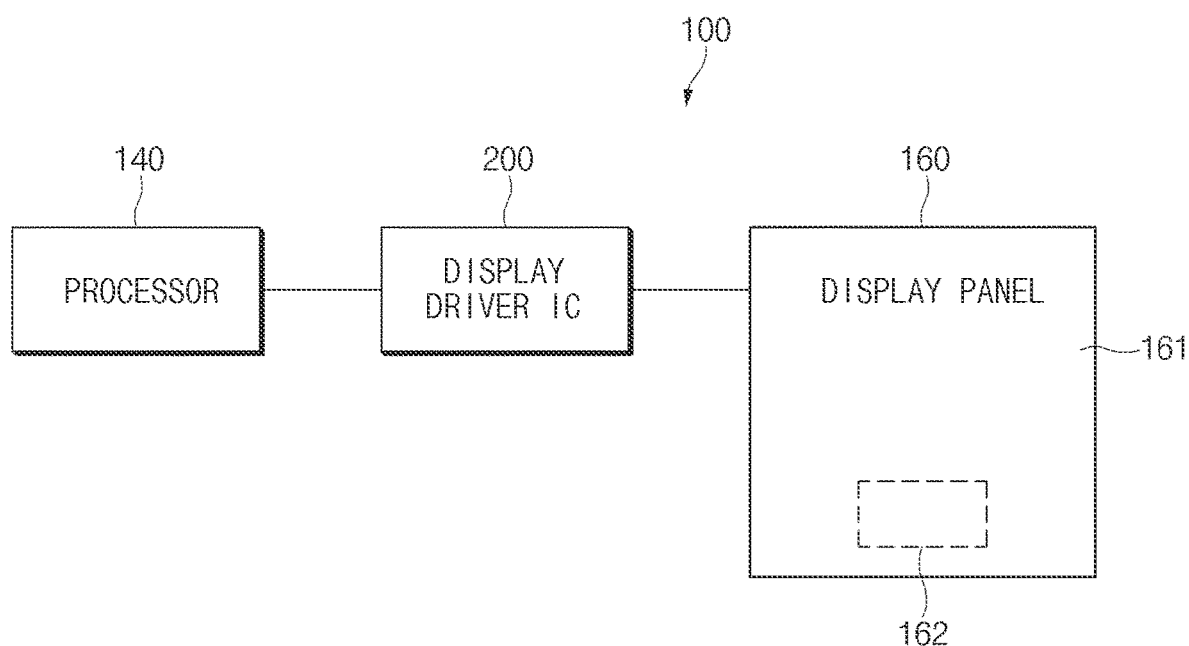
FIG. 1 is a drawing schematically illustrating a configuration of an electronic device including a display driver integrated circuit (IC) according to an embodiment of the disclosure.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the expressions "have," "may have," "include" and "comprise," or "may include" and "may comprise" used herein indicate existence of corresponding features (e.g., components such as numeric values, functions, operations, or parts) but do not exclude presence of additional features.

In the disclosure, the expressions "A or B," "at least one of A or/and B," or "one or more of A or/and B," and the like may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for," "having the capacity to," "designed to," "adapted to," "made to," or "capable of" The term "configured to (or set to)" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the disclosure and are not intended to limit the scope of the disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the disclosure. In some cases, even if terms are terms which are defined in the specification, they may not be interpreted to exclude embodiments of the disclosure.

An electronic device according to various embodiments of the disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments, the electronic device may be a smart home appliance. The smart home appliance may include at least one of, for example, a TV, a DVD player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, or an electronic picture frame.

In another embodiment, the electronic device may include at least one of various medical devices (e.g., various portable medical measurement devices (a blood glucose measuring device, a heart rate measuring device, a blood pressure measuring device, or a body temperature measuring device), magnetic resonance angiography (MRA), magnetic resonance imaging (MRI), computed tomography (CT), a scanner, or an ultrasonic device), a navigation device, a global positioning system (GPS) receiver, an event data recorder (EDR), a flight data recorder (FDR), a vehicle infotainment device, electronic equipment for vessels (e.g., a navigation system or a gyrocompass), avionics, a security device, a head unit for a vehicle, an industrial or home robot, an automatic teller machine (ATM), a point of sales (POS) of a store, or an Internet of things (IoT) device (e.g., a bulb, various sensors, an electric or gas meter, a sprinkler, a fire alarm, a thermostat, a streetlamp, a toaster, exercise equipment, a hot water tank, a heater, or a boiler).

According to various embodiments, the electronic device may include at least one of a part of furniture or a building/structure, an electronic board, an electronic signature receiving device, a projector, or a measuring instrument (e.g., a water meter, an electricity meter, a gas meter, or a wave meter). In various embodiments, the electronic device may be one or more combinations of the above-mentioned devices. In various embodiments, the electronic device may be a flexible device. The electronic device according to the disclosure is not limited to the above-mentioned devices, and may include new electronic devices with the development of technology.

Hereinafter, electronic devices according to an embodiment of the disclosure will be described with reference to the accompanying drawings. The term "user" used herein may refer to a person who uses an electronic device or may refer to a device (e.g., an artificial electronic device) that uses an electronic device.

Figure 2:
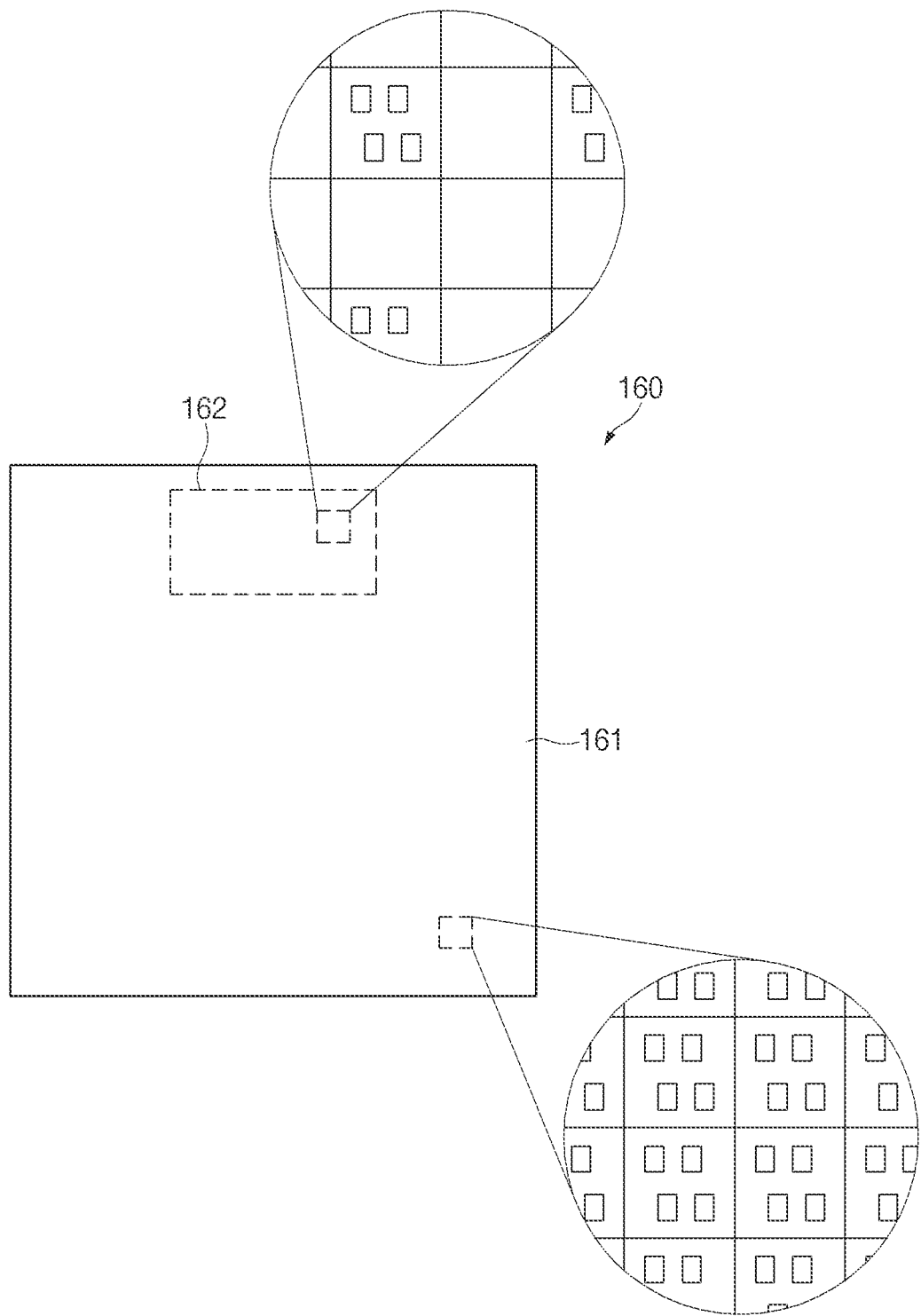
FIG. 2 illustrates a pixel arrangement shape of display areas of a display panel according to an embodiment of the disclosure.

FIG. 1 is a drawing schematically illustrating a configuration of an electronic device including a display driver IC according to an embodiment of the disclosure. FIG. 2 illustrates a pixel arrangement shape of display areas of a display panel according to an embodiment of the disclosure.

Referring to FIG. 1, an electronic device 100 may include a processor 140 (e.g., an application processor (AP)), a display driver integrated circuit (IC) (DDI) 200, and a display panel 160. The electronic device 100 may be implemented as, for example, a portable electronic device. According to various embodiments, the display driver IC 200 and the display panel 160 may be implemented as a separate (or external) display device (or display module) except for the processor 140. As the display panel 160 includes display areas with different pixel arrangement densities and supplies different gamma voltages (or gamma tap voltages) depending on the display areas, the electronic device 100 of the above-mentioned components may assist in displaying an image of the same color or the same luminance as an adjacent area although there are the different pixel arrangement densities.

The display panel 160 may display display data by the display driver IC 200. According to an embodiment, the display panel 160 may be implemented as a thin film transistor-liquid crystal display (TFT-LCD) panel, a light emitting diode (LED) display panel, an organic LED (OLED) display panel, an active-matrix OLED (AMOLED) display panel, or a flexible display panel.

For example, in the display panel 160, gate lines and source lines may be arranged to be crossed in the form of a matrix. A gate signal may be supplied to the gate lines. According to an embodiment, a gate signal may be sequentially supplied to the gate lines. According to various embodiments, a first gate signal may be supplied to odd-numbered gate lines among the gate lines, and a second gate signal may be supplied to even-numbered gate lines among the gate lines. The first gate signal and the second gate signal may include signals which are alternately supplied. Alternatively, after the first gate signal is sequentially supplied from a start line of the odd-numbered gate lines to an end line of the odd-numbered gate lines, the second gate signal may be sequentially supplied from a start line of the even-numbered gate lines to an end line of the even-numbered gate lines. A signal corresponding to display data may be supplied to the source lines. The signal corresponding to the display data may be supplied from a source driver under control of a timing controller of a logic circuit.

Referring to FIG. 2, a display panel 160 may include a first display area 161 and a second display area 162, which have different pixel arrangement densities. For example, the first display area 161 may include an area where pixels are consecutively arranged in neighboring pixel arrangement subareas (or an area where pixels are consecutively arranged in subareas in the form of a matrix or an area where all of certain pixel groups (e.g., red, green, blue (RGB) or red, green, green, blue (RGGB)) are respectively arranged in subareas in the form of a matrix). In the first display area 161, subpixels in the form of Pentile may be arranged in one pixel arrangement subarea (e.g., one rectangular subarea) or subpixels in the form of an RGB layout may be arranged in one pixel arrangement subarea, depending on a characteristic of the display panel 160. The second display area 162 may have a pixel arrangement density different from the first display area 161. For example, in the second display area 162, pixels may be arranged at a certain distance in pixel arrangement subareas in the form of a matrix. For example, a pixel (e.g., Red, Green, Blue, Green (RGBG) or Red, Green, Blue (RGB)) may be disposed in one pixel arrangement subarea every four pixel arrangement subareas, and a pixel may not be disposed in the other three pixel arrangement subareas to be empty. According to various embodiments, the second display area 162 may include a plurality of pixel arrangement subareas. Pixels may be intermittently arranged irregularly (or randomly) or according to a specified pattern in the plurality of pixel arrangement subareas. The second display area 162 may include, for example, an area of a size corresponding to at least one sensor area disposed on a front surface of the electronic device 100. According to an embodiment, the second display area 162 may include an area in which a camera is disposed in a lower portion of the display panel 160 (e.g., an area corresponding to a camera size or an area corresponding to an image sensor unit which receives a signal associated with an image in the camera). Alternatively, the second display area 162 may include a size of at least a partial area corresponding to an area in which structures such as a fingerprint sensor or an iris sensor, a microphone, and a speaker are arranged in the lower portion of the display panel 160. There may be the at least one second display area 162 in various areas of the display panel 160. For example, the second display area 162 may be formed in an area such as a right upper side, an upper center, a left upper side, a right lower side, a lower center, or a left lower side of the display panel 160. According to various embodiments, patterns of subpixels arranged in the first display area 161 and the second display area 162 may be configured to be the same as each other or may be configured to be different from each other. For example, when subpixels are arranged in an RGBG pattern in the first display area 161, subpixels may be arranged in the RGBG pattern in the second display area 162. In this state, in the second display area 162, subpixels in the RGBG pattern may be arranged in some of the plurality of pixel arrangement subareas. Alternatively, when subpixels are arranged in an RGBG (or RGB) pattern in the first display area 161, subpixels may be arranged in the RGB (or RGBG) pattern in the second display area 162. In this state, in the second display area 162, subpixels in the RGB pattern may be arranged in some of the plurality of pixel arrangement subareas.

The processor 140 may control the overall operation of the electronic device 100. According to an embodiment, the processor 140 may be implemented with an integrated circuit, a system on chip, or a mobile AP. The processor 140 may transmit data to be displayed (e.g., image data, moving image data, or still image data as display data) to the display driver IC 200. According to an embodiment, the display data may be divided in units of line data corresponding to a horizontal line (or vertical line) of the display panel 160. The processor 140 may deliver a control signal for differently controlling an operation form of a gamma generator of the display panel 160 depending on a display area to the display driver IC 200. Alternatively, the processor 140 may deliver a control signal for controlling operations of gamma generators designed to supply different gamma voltages to display areas for each display area to the display driver IC 200.

According to various embodiments, the processor 140 may control the supplying of a gamma voltage (or a gamma tap voltage) to be supplied to the first display area 161 of the display panel 160 (e.g., an area where pixels are arranged in the form of a matrix while being adjacent to each other) and the second display area 162. For example, the processor 140 may control the displaying of a screen on the second display area 162 with a relatively low pixel arrangement density to be performed to be the same as the first display area 161, in conjunction with display data of content output to the first display area 161 and the second display area 162. For example, when content (or an image or an object) with the same color and luminance should be displayed over the first display area 161 and the second display area 162, because the pixel arrangement densities are different from each other, content output to the first display area 161 and content output to the second display area 162 may differ in display form from each other. The processor 140 may control the adjustment of a gamma signal (e.g., at least one of an analog gamma voltage and a digital gamma voltage) of display data corresponding to content output to the second display area 162, such that content (or an image or an object) with the same color and luminance is displayed over the first display area 161 and the second display area 162, with regard to the pixel arrangement densities of the first display area 161 and the second display area 162. Herein, the processor 140 may control to adjust a gamma signal (e.g., adjust only the analog gamma voltage or adjust the analog gamma voltage and the digital gamma voltage together) depending on a gray level of content to be output to the second display area 162.

The display driver IC 200 may change data provided from the processor 140 into a form capable of being transmitted to the display panel 160 and may transmit the changed data to the display panel 160. The changed data may be supplied on a pixel-by-pixel basis (or on a subpixel-by-subpixel basis). Herein, a pixel may have a structure in which subpixels Red, Green, and Blue are arranged adjacent to each other, in conjunction with displaying a specified color. One pixel may include RGB subpixels (RGB stripe layout structure) or may include RGBG subpixels (Pentile layout structure). Herein, an arrangement structure of the RGBG subpixels may be replaced with an arrangement structure of RGGB subpixels. Alternatively, the pixel may be replaced with an arrangement structure of red, green, blue, white (RGBW) subpixels.

According to an embodiment, the display driver IC 200 may process pieces of display data supplied to the display panel 160 on a pixel-by-pixel basis depending on the display area. For example, the display driver IC 200 may include a gamma generator for supplying a gamma tap voltage to the first display area 161 in response to control of the processor 140 and an extra gamma generator for supplying a gamma tap voltage to the second display area 162 and may control each gamma generator to generate a signal.

According to various embodiments, the display driver IC 200 may generate a gamma voltage (or a gamma tap voltage) to be supplied to subpixels arranged in the second display area 162 using some of gamma generators which supply a gamma tap voltage to the first display area 161. In this case, the display driver IC 200 may differently control a specific gamma generator among the gamma generators to generate a gamma voltage.

Figure 3:
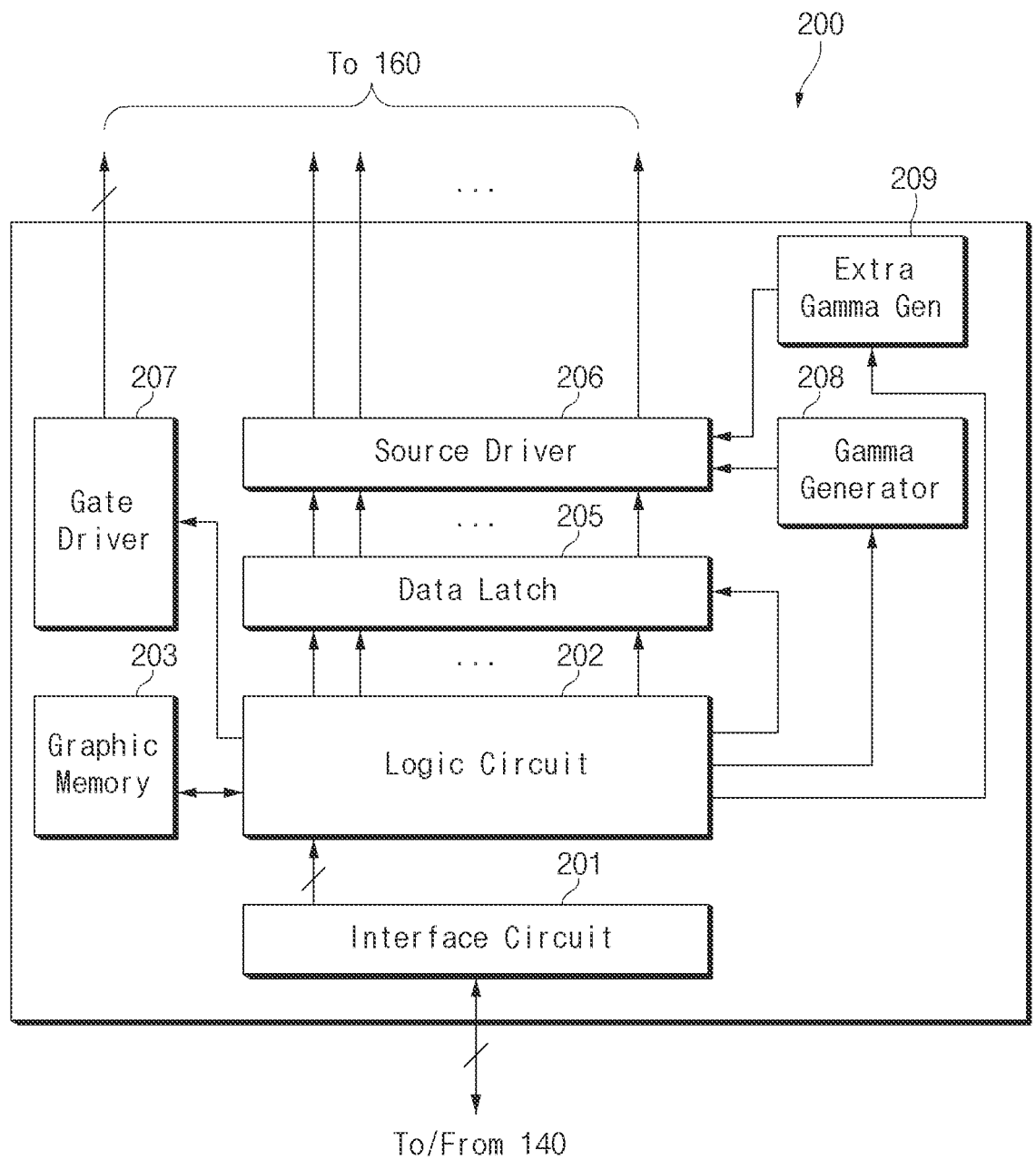
FIG. 3 is a drawing illustrating a display driver IC according to an embodiment of the disclosure.

FIG. 3 is a drawing illustrating a display driver IC according to an embodiment of the disclosure.

Referring to FIGS. 1 and 3, a display driver IC 200 may include an interface circuit 201, a logic circuit 202, a graphic memory 203, a data latch 205 (or a shift register), a source driver 206, a gate driver 207, a gamma generator 208, and an extra gamma generator 209.

The interface circuit 201 may interface signals or data transmitted and received between a processor 140 and the display driver IC 200. The interface circuit 201 may interface line data transmitted from the processor 140 to transmit the line data to a graphic memory write controller of the logic circuit 202. According to an embodiment, the interface circuit 201 may be an interface associated with a serial interface such as a mobile industry processor interface (MIPI®), a mobile display digital interface (MDDI), a displayport, or an embedded displayport (eDP).

The logic circuit 202 may include a graphic memory write controller, a timing controller, a graphic memory read controller, an image processing unit, a source shift register controller, and a data shift register.

The graphic memory write controller of the logic circuit 202 may control an operation of receiving line data from the interface circuit 201 and writing the received line data in the graphic memory 203.

The timing controller may supply a synchronizing signal and/or a clock signal to each component (e.g., a graphic memory read controller) of the display driver IC 200.

Furthermore, the timing controller may transmit a read command (RCMD) for controlling a read operation of the graphic memory 203 to the graphic memory read controller. The timing controller may control the source driver 206 to supply display data. Furthermore, the timing controller may control the gate driver 207 to output a gate signal. For example, the timing controller may control the gate driver 207 to sequentially supply a gate signal to gate signal lines of the display panel 160. Alternatively, the timing controller may control the gate driver 207 to separately output a gate signal to odd-numbered lines and even-numbered lines of the gate signal lines of the display panel 160.

According to an embodiment, the timing controller may control a digital gamma voltage to be generated and delivered according to a display area. For example, the timing controller may control the gamma generator 208 to generate a signal to generate a gamma voltage to be supplied to a first display area 161. Alternatively, the timing controller may control the extra gamma generator 209 to generate a signal to generate a gamma voltage (or a gamma tap voltage) to be supplied to a second display area 162. In the above-mentioned operation, the timing controller may control a source amplifier, the gamma generator 208, and the extra gamma generator 209 to control (e.g., time division driving) an output timing of the source amplifier to supply a gamma voltage to be supplied to a corresponding subpixel to a decoder associated with the corresponding subpixel.

According to an embodiment, the processor 140 or the timing controller may control supply timings of digital gamma voltages associated with respective subpixels, in a process of generating a gamma voltage based on circuit elements corresponding to a subpixel specified by the gamma generator 208 and delivering the generated gamma voltage to the decoder. Alternatively, the processor 140 or the timing controller may control the generated gamma voltage to be delivered to source amplifiers through respective decoders, in response to a specified subpixel at a specified timing. In this operation, the timing controller may control an output timing of the source amplifier by time division to generate an output of the source amplifier, based on a digital gamma voltage corresponding to display data for each subpixel, and control the generated output to be supplied to the corresponding subpixel.

The graphic memory read controller may perform a read operation for line data stored in the graphic memory 203. According to an embodiment, the graphic memory read controller may perform a read operation for all or some of the line data stored in the graphic memory 203, based on a read command (RCMD) for line data. The graphic memory read controller may transmit all or some of line data read from the graphic memory 203 to the image processing unit. The graphic memory write controller and the graphic memory read controller are described as being independent of each other for convenience of description. However, the graphic memory write controller and the graphic memory read controller may be implemented as one graphic memory controller.

The image processing unit may improve image quality by processing all of line data transmitted from the graphic memory read controller or some of the line data. Display data, the image quality of which is improved, may be delivered to the timing controller. The timing controller may deliver the display data to the source driver 206 through the data latch 205. The image processing unit may include a first gamma voltage table for driving the first display area 161 and a second gamma voltage table for driving the second display area 162. Alternatively, the timing controller may include a first gamma voltage table for driving the first display area 161 and a second gamma voltage table for driving the second display area 162.

The source shift register controller may control a data shifting operation of the data shift register. According to an embodiment, the source shift register controller may perform control such as line data write of the graphic memory 203 or image preprocessing of the image processing unit in response to an instruction received from the processor 140.

The data shift register may shift display data transmitted through the source shift register controller, under control of the source shift register controller. The data shift register may sequentially transmit the shifted display data to the data latch 205.

The graphic memory 203 may store line data input through the graphic memory write controller, under control of the graphic memory write controller. The graphic memory 203 may operate as a buffer memory in the display driver IC 200. According to an embodiment, the graphic memory 203 may include a graphic random access memory (GRAM).

The data latch 205 may store display data sequentially provided from the data shift register. The data latch 205 may transmit the stored display data to the source driver 206 in units of a horizontal line of the display panel 160.

The source driver 206 may transmit line data, transmitted from the data latch 205, to the display panel 160. According to an embodiment, the source driver 206 may include a plurality of source amplifiers connected with subpixels (or for each channel corresponding to the subpixel). The source amplifiers included in the source driver 206 may operate in time division to supply a signal to respective subpixels. According to an embodiment, the source amplifiers included in the source driver 206 may be connected with a plurality of subpixels of the same type or different types. In the structure of the display panel 160 including an RGB pixel, the source driver 206 may include source amplifiers connected for each subpixel (e.g., an R subpixel, a G subpixel, or a B subpixel).

The source driver 206 may include a plurality of decoders connected with input terminals of source amplifiers with which subpixels are connected. The decoder may be connected with output terminals of the gamma generator 208, the extra gamma generator 209, and the logic circuit 202 and may decode (or multiply) display data delivered from the logic circuit 202 and gamma voltages provided by the gamma generator 208 and the extra gamma generator 209. Respective decoder outputs may be connected with respective source amplifiers. A decoder connected with source amplifiers allocated to the first display area 161 among the plurality of decoders included in the source driver 206 may select a gamma voltage corresponding to one of a first number of gray values (e.g., 256, when display data consists of 8 bits).

A decoder connected with source amplifiers arranged to supply a signal to the second display area 162 among the plurality of decoders included in the source driver 206 may select a gamma voltage corresponding to one of a second number of gray values (e.g., a number greater than the first number). For example, a decoder connected with source amplifiers arranged to supply a signal to the second display area 162 may select one of 256 gray values capable of being supplied to the first display area 161 disposed below a plane such as the second display area 162 and a certain number of gray values to be supplied to the second display area 162.

A certain number of gray values to be supplied to the second display area 162 may have, for example, a number of gray values less than 256 gray values, which may have a gamma voltage of a magnitude different from 256 gray values to be supplied to the first display area 161. Alternatively, a gamma voltage of a magnitude different from a gamma voltage supplied to a subpixel of the first display area 161 may be supplied to a subpixel of the second display area 162. For example, a first gamma voltage magnitude of 256 gray levels which are a maximum brightness value of a signal (e.g., any one of R, G, or B) to be supplied to the first display area 161 and a second gamma voltage level of 256 gray levels which are a maximum brightness value of a signal (e.g., any one of R, G, or B) to be supplied to the second display area 162 may be different from each other. According to an embodiment, the second gamma voltage magnitude may be N times (where N is a real number, float) the first gamma voltage magnitude. Alternatively, the first gamma voltage magnitude and the second gamma voltage magnitude may be different from each other according to a difference between a pixel arrangement density of the second display area 162 and a pixel arrangement density of the first display area 161.

According to various embodiments, the first gamma voltage magnitude to be supplied to the first display area 161 in a low gray area (e.g., 1 to 100 gray values) which is relatively low and the second gamma voltage magnitude to be supplied to the second display area 162 may be the same as or similar to each other. According to an embodiment, the first gamma voltage magnitude to be supplied to the first display area 161 in a high gray area (e.g., 101 or more gray values) which is relatively high and the second gamma voltage magnitude to be supplied to the second display area 162 may be set different from each other (e.g., the second gamma voltage magnitude in the high gray area may be set to be greater than the first gamma voltage magnitude).

According to various embodiments, a difference between the first gamma voltage magnitude and the second gamma voltage magnitude may vary depending on ambient illumination intensity. In this regard, a lookup table or a gamma voltage table (basically including a first gamma voltage table to be applied to the first display area 161 and a second gamma voltage table to be applied to the second display area 162) corresponding to a gamma voltage curve disposed in at least one of the timing controller or the image processing unit may be stored as a plurality of tables (e.g., tables corresponding to another gamma voltage curve for each display area and each external illumination intensity) in units of certain external illumination intensity. The processor 140 may determine whether to use any gamma voltage table, depending on external illumination intensity, and may supply a control signal according to it to the display driver IC 200.

The gate driver 207 may drive gate lines of the display panel 160. The gate driver 207 may sequentially supply a gate signal to the gate lines of the display panel 160 under control of the logic circuit 202. Alternatively, the gate driver 207 may divide the gate lines of the display panel 160 into odd-numbered lines or even-numbered lines under control of the logic circuit 202 and may supply a gate signal to each of the divided lines. In this regard, the gate driver 207 may include a plurality of gate drivers (e.g., a left gate driver and a right gate driver). As described above, as operations of pixels implemented in the display panel 160 are controlled by the source driver 206 and the gate driver 207, display data (or an image corresponding to the display data) input from the processor 140 may be displayed on the display panel 160.

The gamma generator 208 may generate and supply a gamma voltage (or a gamma tap voltage) associated with adjusting a luminance of the display panel 160 based on circuit elements for each subpixel. The gamma generator 208 may generate a gamma signal corresponding to at least one of a first color (e.g., red), a second color (e.g., green), or a third color (e.g., blue), for example, an analog gamma voltage and may supply the generated analog gamma voltage to the source driver 206. The analog gamma voltage may be generated based on a first gamma voltage curve which is stored in response to a specified color. According to an embodiment, the gamma generator 208 may generate an analog gamma voltage to be supplied to the first display area 161 based on the first gamma voltage curve and may supply the generated analog gamma voltage to decoders. In this regard, the gamma generator 208 may generate and supply a gamma voltage for each subpixel to be supplied to the first display area 161 in the form of time division to the source driver 206 in response to control of the logic circuit 202. For example, the gamma generator 208 may generate a gamma voltage to be supplied to each subpixel disposed on the first display area 161 every one horizontal synchronization (Hsync) period and may supply the generated gamma voltage to the source driver 206. A length of one horizontal synchronization (Hsync) period may vary depending on a driving frequency value of the display panel 160.

The extra gamma generator 209 may generate and supply a gamma voltage (or a gamma tap voltage) associated with adjusting a luminance of the display panel 160 based on circuit elements for each subpixel disposed on the second display area 162. Alternatively, the extra gamma generator 209 may generate a common analog gamma voltage to be supplied to the second display area 162 irrespective of a color and may supply it to the source driver 206. At this time, the analog gamma voltage generated by the extra gamma generator 209 may be generated based on a second gamma voltage curve which is stored in response to a specified color. According to an embodiment, the extra gamma generator 209 may generate an analog gamma voltage to be supplied to the second display area 162 based on the second gamma voltage curve and may supply the generated analog gamma voltage to decoders. In this regard, the gamma generator 209 may generate and supply a gamma voltage for each subpixel to be supplied to the second display area 162 in the form of time division to the source driver 206 in response to control of the logic circuit 202. According to various embodiments, the analog gamma voltage to be supplied to the second display area 162 may be configured to be generated and supplied by a gamma generator associated with any one subpixel in the gamma generator 208.

Figure 4:
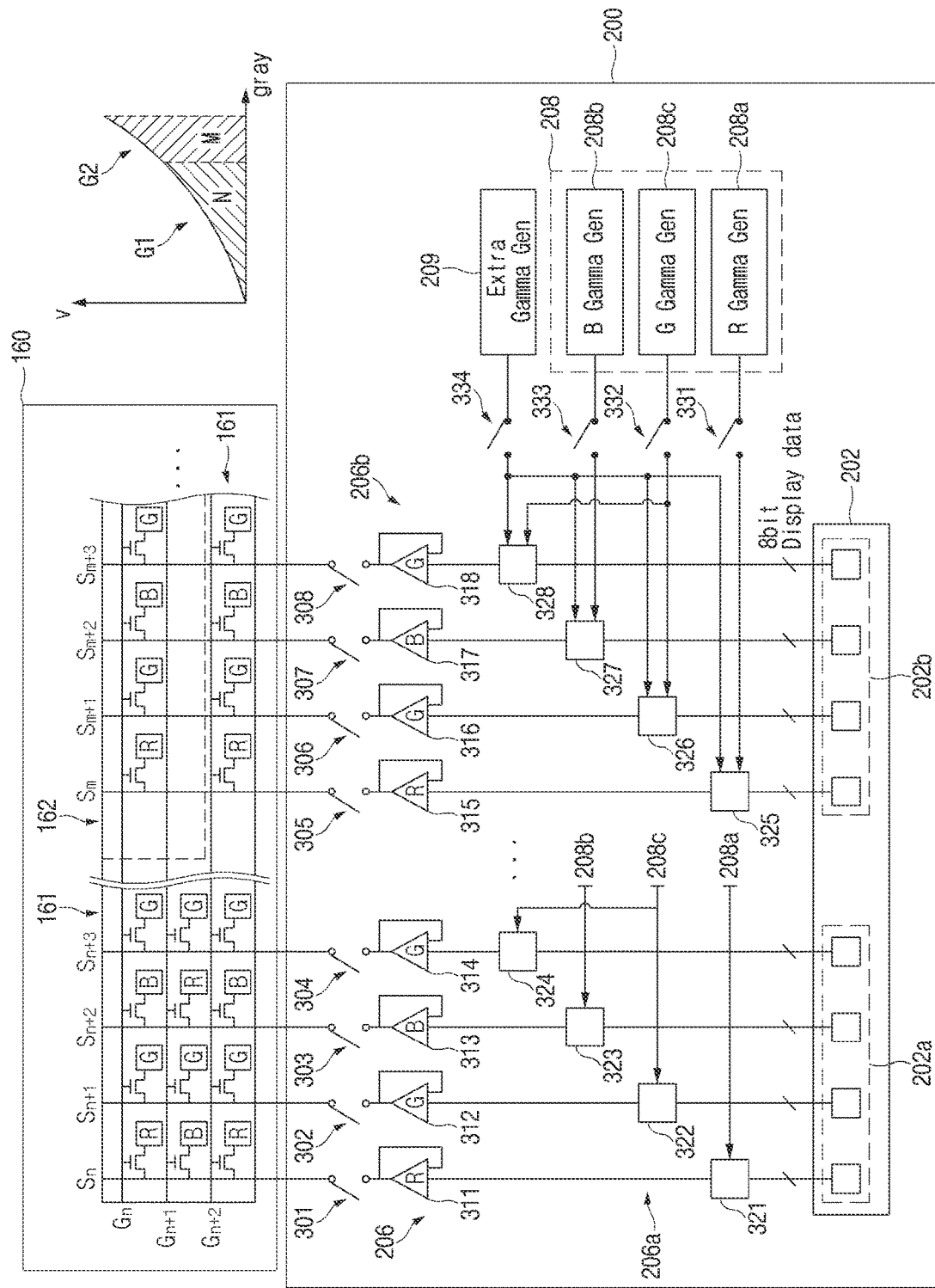
FIG. 4 is a drawing illustrating an example of some components of a display panel and a display driver IC according to an embodiment of the disclosure.

FIG. 4 is a drawing illustrating an example of some components of a display panel and a display driver IC according to an embodiment of the disclosure.

Referring to FIG. 4, some components of an electronic device 100 may include a first display area 161 and a second display area 162 of a Pentile layout (or type), a source driver 206, a gamma generator 208, an extra gamma generator 209, a first logic circuit 202a, and a second logic circuit 202b.

The first display area 161 of the Pentile type may include, for example, a display area in which a plurality of gate lines Gn, Gn+1, and Gn+2 and four source lines Sn, Sn+1, Sn+2, and Sn+3 are crossed and arranged. The display panel 160 may further include a non-display area on which a first source driver 206a which supplies display data to the gate lines Gn, Gn+1, and Gn+2 and the source lines Sn, Sn+1, Sn+2, and Sn+3 and a gate driver 207 which supplies a gate signal are mounted. Alternatively, the above-mentioned display driver IC 200 may be disposed in the non-display area of the display panel 160.

The gate lines Gn, Gn+1, and Gn+2 of the first display area 161 may include, for example, the odd-numbered gate lines Gn and Gn+2 and the even-numbered gate lines Gn+1. The odd-numbered gate lines Gn and Gn+2 and the even-numbered gate lines Gn+1 may be alternately supplied with a gate signal. According to an embodiment, in the odd-numbered gate lines Gn and Gn+2, RGBG subpixels may form one pixel and may be repeatedly arranged. In the even-numbered gate lines Gn+1, BGRG subpixels may form one pixel (or one subpixel group) and may be repeatedly arranged. The above-mentioned order of RGBG may be substantially the same pattern as BGRG, and a start order or a last order is differently disposed.

The source lines Sn, Sn+1, Sn+2, and Sn+3 may include the first channel Sn in which a red subpixel and a blue subpixel are alternately arranged, the second channel Sn+1 in which first green subpixels are arranged, the third channel Sn+2 in which a blue subpixel and a red subpixel are alternately arranged, and the fourth channel Sn+3 in which second green subpixels are arranged. The above-mentioned source lines Sn, Sn+1, Sn+2, and Sn+3 may include a group of four subpixels included in one pixel. Pads connected with output terminals of amplifiers of the first source driver 206a may be arranged on one side of the first display area 161, for example, ends of the respective channels of the source lines Sn, Sn+1, Sn+2, and Sn+3.

The source driver 206 may include a first source driver 206a for supplying a signal to channels of the first display area 161 and a second source driver 206b for supplying a signal to channels of the second display area 162. Herein, the first source driver 206a and the second source driver 206b may be integrated into the one source driver 206, which may be arranged in one body to be differently divided according to an area which supplies a source signal. For example, the first source driver 206a may include source driver elements which supply a signal to only the first display area 161, and the second source driver 206b may include source driver elements which supply a source signal to the first display area 161 and the second display area 162.

For example, the first source driver 206a may include, for example, a first amplifier 311 for supplying a signal to the first channel Sn among the source lines Sn, Sn+1, Sn+2, and Sn+3, a second amplifier 312 for supplying a signal to the second channel Sn+1, a third amplifier 313 for supplying a signal to the third channel Sn+2, and a fourth amplifier 314 for supplying a signal to the fourth channel Sn+3. Furthermore, the first source driver 206a may include a first switch 301 connected with an output terminal of the first amplifier 311, a second switch 302 connected with an output terminal of the second amplifier 312, a third switch 303 connected with an output terminal of the third amplifier 313, and a fourth switch 304 connected with an output terminal of the fourth amplifier 314. For example, a control signal of each of the switches may be provided from, for example, a timing controller which receives a control signal of a processor 140. The first source driver 206a may include a first decoder 321 disposed at an input terminal of the first amplifier 311, a second decoder 322 disposed at an input terminal of the second amplifier 312, a third decoder 323 disposed at an input terminal of the third amplifier 313, and a fourth decoder 324 disposed at an input terminal of the fourth amplifier 314.

The first, second, third, and fourth decoders 321, 322, 323, and 324 may receive display data and a digital gamma value associated with driving the first display area 161 from the first logic circuit 202a. Furthermore, the first, second, third, and fourth decoders 321, 322, 323, and 324 may receive outputs of the gamma generator 208.

The gamma generator 208 may include, for example, a first gamma generator 208a for generating and supplying an analog gamma value associated with a color of a first subpixel (e.g., a red subpixel) to the first decoder 321, a second gamma generator 208c for generating and supplying an analog gamma value associated with a color of a second subpixel and a fourth subpixel (e.g., a green subpixel) to the second decoder 322 and the fourth decoder 324, and a third gamma generator 208b for generating and supplying an analog gamma value associated with a color of a third subpixel (e.g., a blue subpixel) to the third decoder 323.

The logic circuit 202 may include a first logic circuit 202a and a second logic circuit 202b. Meanwhile, the first logic circuit 202a and the second logic circuit 202b may be divided by the first display area 161 and the second display area 162, which supply display data and digital gamma values, which may be configured as one integrated circuit or may be configured as two logic circuits. The first logic circuit 202a may supply display data to be supplied to the source lines Sn, Sn+1, Sn+2, Sn+3 to the first, second, third, and fourth decoders 321, 322, 323, and 324 arranged for each channel One pixel (e.g., a group of RGBG subpixels) is exemplified and described in the above-mentioned description. In the first display area 161 in which the plurality of pixels are arranged, the first logic circuit 202a may supply display data to source lines corresponding to the respective pixels.

The second display area 162 may include, for example, a display area in which a plurality of gate lines Gn, Gn+1, and Gn+2 and a plurality of source lines Sm, Sm+1, Sm+2, and Sm+3 are crossed and arranged. The display panel 160 may further include a non-display area on which a second source driver 206b which supplies display data to the gate lines Gn, Gn+1, and Gn+2 and the source lines Sm, Sm+1, Sm+2, and Sm+3 and a gate driver 207 which supplies a gate signal are mounted. Alternatively, the above-mentioned display driver IC 200 may be disposed in the non-display area of the display panel 160. One logic circuit into which the first source driver 206a and the second source driver 206b are integrated may be disposed in the non-display area of the display panel 160. Furthermore, a first gate driver for driving odd-numbered gate lines and a second gate driver for driving even-numbered gate lines may be arranged in the non-display area of the display panel 160.

The gate lines Gn, Gn2, and Gn+2 of the second display area 162 may include, for example, the odd-numbered gate lines Gn and Gn+2 and the even-numbered gate lines Gn+1 to be the same as the first display area 161. The odd-numbered gate lines Gn and Gn+2 and the even-numbered gate lines Gn+1 may be alternately supplied with a gate signal to be the same as the first display area 161. According to an embodiment, RGBG subpixels may form one pixel and may be repeatedly arranged on the odd-numbered gate lines Gn and Gn+2 (or the even-numbered gate lines Gn+1) in the second display area 162. In other words, separate pixels may not be arranged on some gate lines in the second display area 162. According to various embodiments, in the second display area 162, separate pixels may not be arranged on some source lines. According to various embodiments, an area where pixels are not alternately arranged on some source lines and some gate lines may be included in the second display area 162.

The source lines Sm, Sm+1, Sm+2, and Sm+3 may include the fifth channel Sm where red subpixels are alternately arranged, the sixth channel Sm+1 where first green subpixels are arranged, the seventh channel Sm+2 where blue subpixels are arranged, and the eighth channel Sm+3 where second green subpixels are arranged. Herein, some subpixels may not be arranged in the second display area 162 among the source lines Sm, Sm+1, Sm+2, and Sm+3, and subpixels may be arranged in the form of a matrix in the first display area 161 disposed below (or above) the second display area 162. Pads connected with output terminals of amplifiers of the second source driver 206*b* may be arranged on ends of the respective channels of the source lines Sm, Sm+1, Sm+2, and Sm+3. Some of the source lines Sm, Sm+1, Sm+2, and Sm+3 may be arranged in the second display area 162, and the others may be arranged in the first display area 161.

The second source driver 206*b* may include, for example, a fifth amplifier 315 for supplying a signal to the fifth channel Sm among the source lines Sm, Sm+1, Sm+2, and Sm+3, a sixth amplifier 316 for supplying a signal to the sixth channel Sm+1, a seventh amplifier 317 for supplying a signal to the seventh channel Sm+2, and an eighth amplifier 318 for supplying a signal to the eighth channel Sm+3. Furthermore, the second source driver 206*b* may include a fifth switch 305 connected with an output terminal of the fifth amplifier 315, a sixth switch 306 connected with an output terminal of the sixth amplifier 316, a seventh switch 307 connected with an output terminal of the seventh amplifier 317, and an eighth switch 308 connected with an output terminal of the eighth amplifier 318. For example, a control signal of each of the switches may be provided from, for example, a timing controller which receives a control signal of the processor 140. The second source driver 206*b* may include a fifth decoder 325 disposed at an input terminal of the fifth amplifier 315, a sixth decoder 326 disposed at an input terminal of the sixth amplifier 316, a seventh decoder 327 disposed at an input terminal of the seventh amplifier 317, and an eighth decoder 328 disposed at an input terminal of the eighth amplifier 318.

The fifth, sixth, seventh, and eighth decoders 325, 326, 327, and 328 may receive display data and a digital gamma value associated with driving the first display area 161 from the second display area 162 from the second logic circuit 202*b*. Furthermore, the fifth, sixth, seventh, and eighth decoders 325, 326, 327, and 328 may receive outputs of the gamma generator 208 and outputs of an extra gamma generator 209.

The extra gamma generator 209 may generate, for example, an analog gamma value (or an analog gamma voltage) associated with colors of subpixels arranged in the second display area 162 and may supply the analog gamma value (or the analog gamma voltage) to the fifth, sixth, seventh, and eighth decoders 325, 326, 327, and 328 in common. The analog gamma value supplied by the extra gamma generator 209 may include a gamma value set such that a brightness of the second display area 162 is the same as or similar to a brightness of the surrounding first display area 161.

The second logic circuit 202*b* may supply display data and a digital gamma value to be supplied to the source lines Sm, Sm+1, Sm+2, and Sm+3 to the fifth, sixth, seventh, and eighth decoders 325, 326, 327, and 328 arranged for each channel For example, the second logic circuit 202*b* may supply display data and a digital gamma value to be supplied to the second display area 162 to the fifth, sixth, seventh, and eighth decoders 325, 326, 327, and 328 arranged for each channel at a timing when a gate signal associated with driving the second display area 162 is supplied. The second logic circuit 202*b* may supply display data and a digital gamma value for driving the first display area 161 disposed below the second display area 162 to the fifth, sixth, seventh, and eighth decoders 325, 326, 327, and 328 arranged for each channel at a timing when a gate signal associated with driving the first display area 161 disposed below the second display area 162 is supplied. The digital gamma value associated with driving the second display area 162 and the digital gamma value associated with driving the first display area 161 may be different from each other, although there are the same source channels.

The fifth, sixth, seventh, and eighth decoders 325, 326, 327, and 328 may have input terminals capable of receiving 8-bit gray values supplied from the gamma generator 208 and input terminals capable of receiving a certain number of gray values supplied from the extra gamma generator 209. The extra gamma generator 209 may supply, for example, 256 gray values to the fifth, sixth, seventh, and eighth decoders 325, 326, 327, and 328 in common to be the same as the gamma generator 208. Alternatively, the gamma generator 208 may supply, for example, a certain number of gray values, for example, only 128 gray values to the fifth, sixth, seventh, and eighth decoders 325, 326, 327, and 328 in common. The analog gamma value generated by the gamma generator 208 may be generated based on a first gamma curve area G1 among illustrated graphs. The analog gamma value generated by the extra gamma generator 209 may be generated based on a second gamma curve area G2 among the illustrated graphs.

According to various embodiments, switches may be arranged at an output terminal of the gamma generator 208. First, second, and third gamma output control switches 331, 332, and 333 may be arranged at output terminals of first, second, and third gamma generator 208*a*, 208*b*, and 208*c*, respectively. A fourth gamma output control switch 334 may be disposed at an output terminal of the extra gamma generator 209. The first, second, third, and fourth gamma output control switches 331, 332, 333, and 334 may be controlled by a timing controller. For example, when the second display area 162 is driven, the first, second, and third gamma output control switches 331, 332, and 333 may be turned off and the fourth gamma output control switch 334 may be turned on. When the first display area 161 is driven, the first, second, and third gamma output control switches 331, 332, and 333 may be turned on and the fourth gamma output control switch 334 may be turned off.

Figure 5:
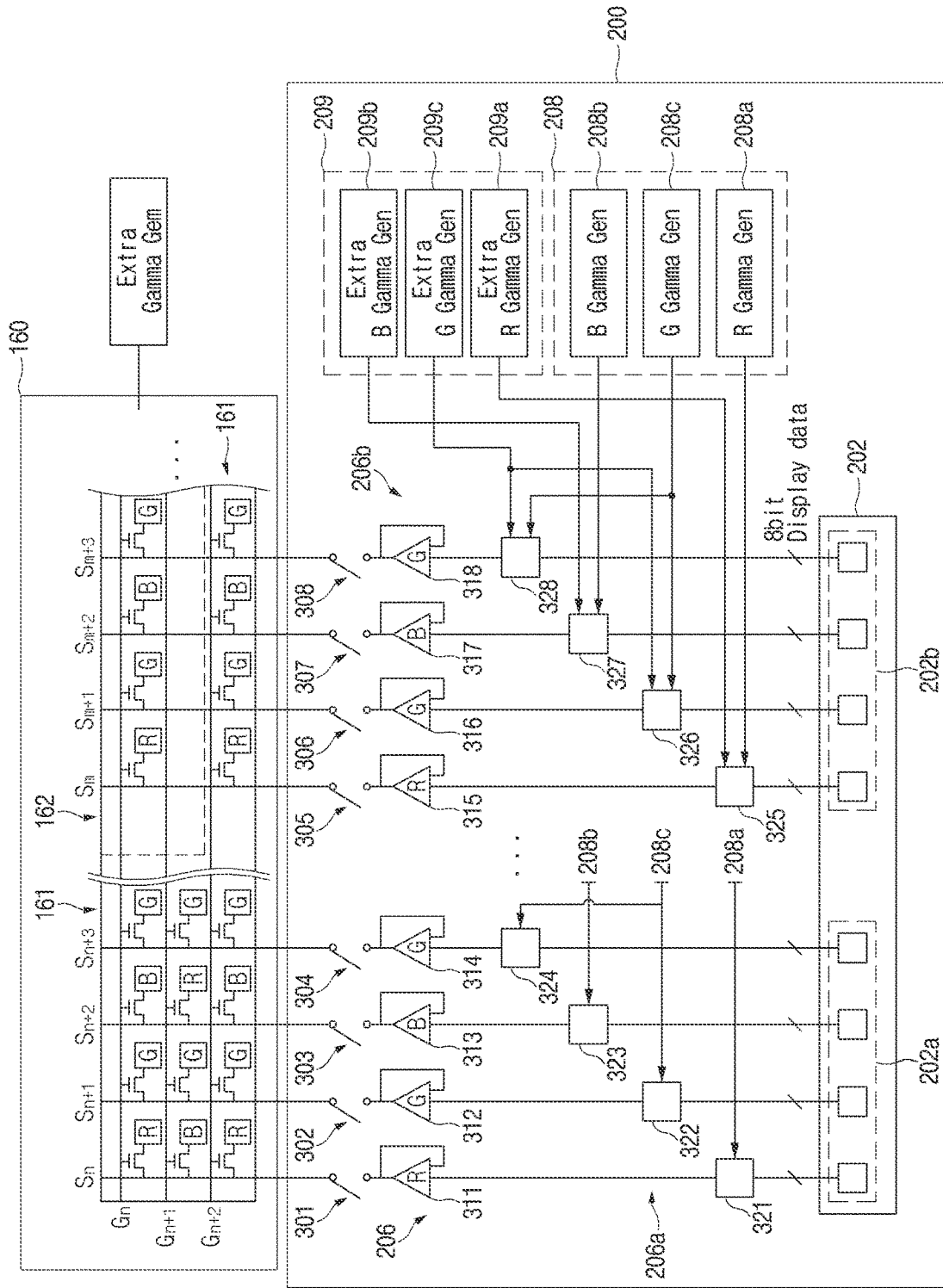
FIG. 5 is a drawing illustrating an example of some components of a display panel and a display driver IC according to an embodiment of the disclosure.

FIG. 5 is a drawing illustrating an example of some components of a display panel and a display driver IC according to an embodiment of the disclosure.

Referring to FIG. 5, some components of an electronic device 100 according to an embodiment may include a first display area 161, a second display area 162, a source driver 206, a gamma generator 208, an extra gamma generator 209, a first logic circuit 202*a*, and a second logic circuit 202*b*. In the above-mentioned description, the first display area 161, the second display area 162, the source driver 206, the gamma generator 208, the first logic circuit 202*a*, and the second logic circuit 202*b* may be substantially the same as respective components described with reference to FIG. 4. The source driver 206 may include a first source driver 206*a* for receiving display data and a digital gamma value from the first logic circuit 202*a* and a second source driver 206*b* for receiving display data and a digital gamma value from the second logic circuit 202*b*. Alternatively, the first source driver 206*a* may include decoders and amplifiers, which supply a signal to source lines arranged in only the first display area 161, and the second source driver 206*b* may include decoders and amplifiers, which supply a signal to source lines arranged in the second display area 162 and the first display area 161.

A display panel 160 of the electronic device 100 may include, for example, the first display area 161 having a first pixel arrangement density and the second display area 162 having a second pixel arrangement density. The first display area 161 may be disposed in, for example, an area adjacent to the second display area 162. According to an embodiment, at least one gate line and at least one source line arranged in the second display area 162 may be connected with some gate lines and some source lines among gate lines and source lines, which are arranged in the first display area 161. For example, the second display area 162 and the first display area 161 may be arranged on source lines Sm, Sm+1, Sm+2, and Sm+3.

The extra gamma generator 209 may include a first extra gamma generator 209a for supplying an analog gamma value to a fifth decoder 325 connected with the fifth channel Sm where a red subpixel is arranged among the source lines Sm, Sm+1, Sm+2, and Sm+3 arranged in the second display area 162, a second extra gamma generator 209c for supplying an analog gamma value to a sixth decoder 326 and an eighth decoder 328 respectively connected with the sixth channel Sm+1 where first green subpixels are arranged and the eighth channel Sm+3 where second green subpixels are arranged, and a third extra gamma generator 209b for supplying an analog gamma value to a seventh decoder 327 connected with the seventh channel Sm+2 where a blue subpixel is disposed. Herein, some subpixels may not be arranged in the second display area 162 among the source lines Sm, Sm+1, Sm+2, and Sm+3, and subpixels may be arranged in the form of a matrix in the first display area 161 disposed below (or above) the second display area 162. Pads connected with output terminals of amplifiers of the second source driver 206b may be arranged on ends of the respective channels of the source lines (or the source channels) Sm, Sm+1, Sm+2, and Sm+3.

The first extra gamma generator 209a may generate an analog gamma value associated with driving subpixels arranged in the second display area 162 in the fifth channel Sm and may supply the analog gamma value to the fifth decoder 325 at a timing when the second display area 162 is driven, for example, a timing when a gate signal is supplied to the second display area 162. The second extra gamma generator 209c may generate an analog gamma value associated with driving subpixels arranged in the second display area 162 among the sixth channel Sm+1 and the eighth channel Sm+3. The second extra gamma generator 209c may supply the generated analog gamma value to the sixth decoder 326 and the eighth decoder 328 at a timing when a gate signal is supplied to the second display area 162. The third extra gamma generator 209b may generate an analog gamma value associated with driving subpixels arranged in the second display area 162 in the seventh channel Sm+2. The third extra gamma generator 209b may supply the generated analog gamma value to the seventh decoder 327 at a timing when a gate signal is supplied to the second display area 162. A value in which a specific pixel may emit relatively higher luminance may be generated by the analog gamma values generated by the first, second, and third extra gamma generators 209a, 209c, and 209b than the analog gamma values generated by the first, second, and third gamma generators 208a, 208c, and 208b. For example, the analog gamma value supplied by the extra gamma generator 209 may include a gamma value set such that a brightness of an area displaying the same content, for example, the second display area 162 is the same as or similar to a brightness of the surrounding first display area 161.

Outputs of the first gamma generator 208a in the gamma generator 208 and the first extra gamma generator 209a may be supplied to the fifth decoder 325. Furthermore, the second logic circuit 202b may supply display data to be supplied to the source lines Sm, Sm+1, Sm+2, and Sm+3 to the fifth, sixth, seventh, and eighth 325, 326, 327, and 328. The second logic circuit 202b may respectively supply a digital gamma value for driving the second display area 162 of the fifth channel Sm, a digital gamma value for driving the second display area 162 of the sixth channel Sm+1 and the eighth channel Sm+3, and a digital gamma value for driving the second display area 162 of the seventh channel Sm+2 to the fifth, sixth, seventh, and eighth decoders 325, 326, 327, and 328. Furthermore, the second logic circuit 202b may respectively supply a digital gamma value for driving the first display area 161 of the fifth channel Sm, a digital gamma value for driving the first display area 161 of the sixth channel Sm+1 and the eighth channel Sm+3, and a digital gamma value for driving the first display area 161 of the seventh channel Sm+2 to the fifth, sixth, seventh, and eighth decoders 325, 326, 327, and 328. Herein, the digital gamma value supplied to each channel of the second display area 162 and the digital gamma value supplied to each channel of the first display area 161 may be set to different values with respect to the same content. For example, the digital gamma value supplied to each channel of the second display area 162 may include a value set to display the same content to be relatively brighter than the digital gamma value supplied to each channel of the first display area 161.

Meanwhile, the shape where the first logic circuit 202a for driving the display panel where only the first display area 161 is disposed and the second logic circuit 202b for driving the display panel where the first display area 161 and the second display area 162 are arranged are divided is described as an example, but the disclosure is not limited thereto. For example, the logic circuit may be physically provided as one component and may generate and supply signals required for each area of the display panel 160. The digital gamma value associated with the second display area 162 and the digital gamma value associated with driving the first display area 161 may be different from each other, although there are the same source channels.

According to various embodiments, additionally or alternatively, switches may be arranged between the output terminals of the first, second, and third extra gamma generators 209a, 209c, and 209b and the fifth, sixth, seventh, and eighth decoders 325, 326, 327, and 328. Furthermore, switches may be arranged between the output terminal of the gamma generator 208 and the fifth, sixth, seventh, and eighth decoders 325, 326, 327, and 328. The switches arranged between the gamma generators and the decoders may separately operate in conjunction with driving the first display area 161 and driving the second display area 162. For example, in conjunction with driving the second display area 162, the switches arranged between the output terminal of the gamma generator 208 and the fifth, sixth, seventh, and eighth decoders 325, 326, 327, and 328 may have a turn-off state and the switches between the output terminal of the extra gamma generator 209 and the fifth, sixth, seventh, and eighth decoders 325, 326, 327, and 328 may have a turn-on state, under control of a timing controller. In conjunction with driving the first display area 161, the switches arranged between the output terminal of the gamma generator 208 and the fifth, sixth, seventh, and eighth decoders 325, 326, 327, and 328 may have a turn-on state and the switches between the output terminal of the extra gamma generator 209 and the fifth, sixth, seventh, and eighth decoders 325, 326, 327, and 328 may have a turn-off state, under control of the timing controller.

Figure 6:
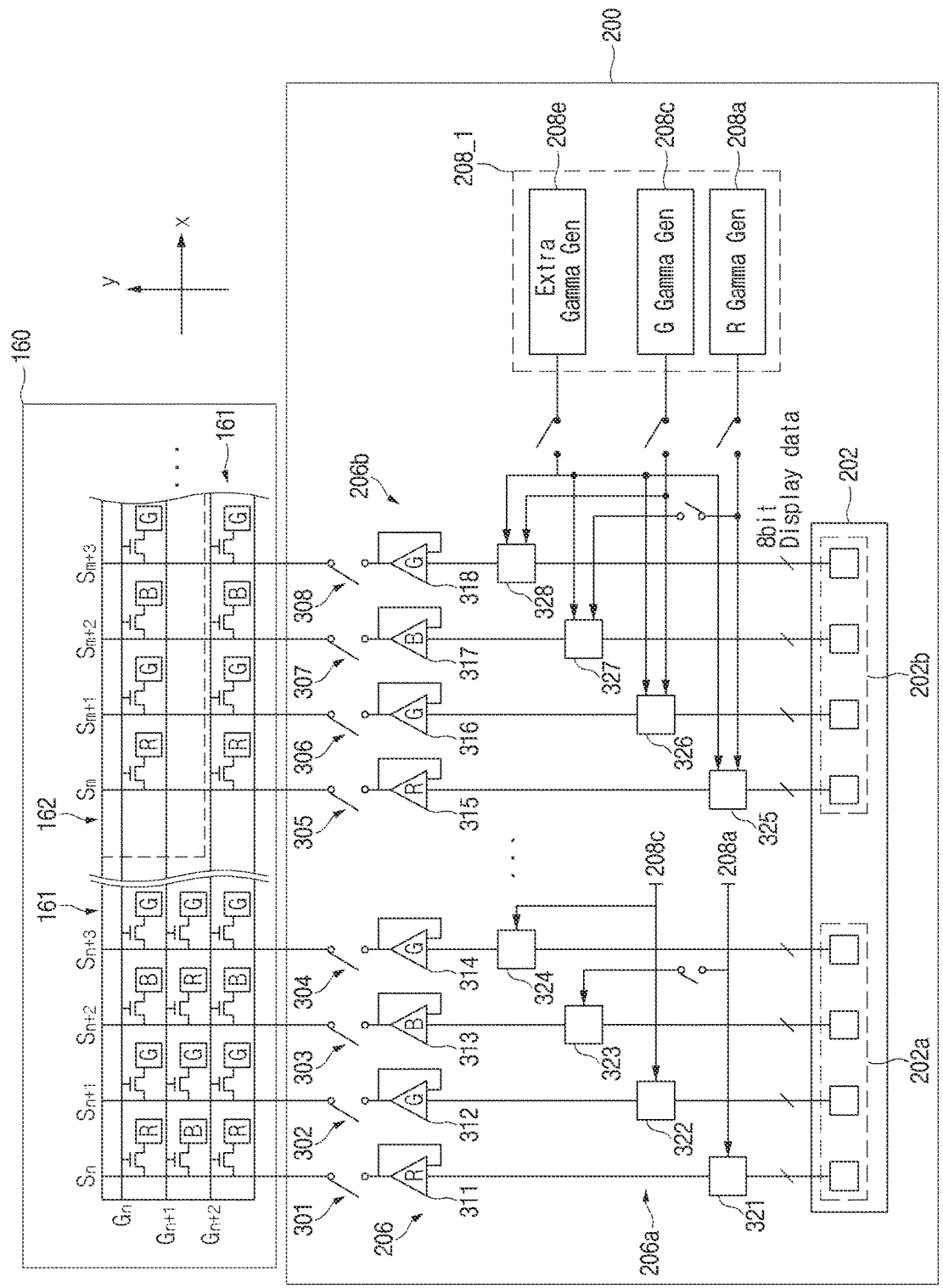
FIG. 6 is a drawing illustrating an example of some components of a display panel and a display driver IC according to an embodiment of the disclosure.

FIG. 6 is a drawing illustrating an example of some components of a display panel and a display driver IC according to an embodiment of the disclosure.

Referring to FIG. 6, some components of an electronic device 100 according to an embodiment may include a first display area 161, a second display area 162, a source driver 206, a gamma generator 208_1, a first logic circuit 202a, and a second logic circuit 202b. In the above-mentioned configuration, the first display area 161, the second display area 162, the source driver 206, the first logic circuit 202a, and the second logic circuit 202b may be substantially the same components as respective components described with reference to FIG. 4. The source driver 206 may include a first source driver 206a disposed between the first display area 161 and the first logic circuit 202a and a second source driver 206b disposed between the second display area 162 and the first display area 161 and the second logic circuit 202b. Meanwhile, the first source driver 206a and the second source driver 206b may be divided for each area, which may be integrated and implemented into one source driver.

A display panel 160 of the electronic device 100 may include, for example, the first display area 161 having a first pixel arrangement density and the second display area 162 having a second pixel arrangement density. For example, source lines Sn, Sn+1, Sn+2, and Sn+3 may be arranged in the first display area 161, and source lines Sm, Sm+1, Sm+2, and Sm+3 may be arranged in an area where the second display area 162 and the first display area 161 are arranged up and down (the first display area 161 may be disposed below the second display area 162 with respect to a y-axis of the display panel 160, the second display area 162 may be disposed above the first display area 161, and the first display area 161 and the second display area 162 may be arranged on the same plane).

The gamma generator 208_1 may include a first gamma generator 208a, a second gamma generator 208c, and an extra gamma generator 208e.

The first gamma generator 208a and the second gamma generator 208c may respectively supply an analog gamma voltage to source lines Sn, Sn+1, Sn+2, and Sn+3 arranged in the first display area 161 and source lines Sm, Sm+1, Sm+2, and Sm+3 arranged in the second display area 162 and the first display area 161. For example, the first gamma generator 208a may generate an analog gamma voltage to be supplied to a red subpixel and a blue subpixel arranged in the first display area 161 and may supply the generated analog gamma voltage to each of decoders (e.g., the first decoder 321 and the third decoder 323) connected with the red subpixel and the blue subpixel. The second gamma generator 208c may generate an analog gamma voltage to be supplied to a first green subpixel and a second green subpixel arranged in the first display area 161 and may supply the generated analog gamma voltage to each of decoders (e.g., the second decoder 322 and the fourth decoder 324) connected with the first green subpixel and the second green subpixel. A switch may be included in conjunction with supplying the analog gamma voltage of the first gamma generator 208a. For example, the switch may be disposed between the output terminal of the first gamma generator 208a and the third decoder 323.

The extra gamma generator 208e may supply an analog gamma voltage to each of the source lines Sm, Sm+1, Sm+2, and Sm+3 arranged in the second display area 162 and the first display area 161. For example, the extra gamma generator 208e may generate a common analog gamma voltage to be supplied to each of decoders (e.g., the fifth, sixth, seventh, and eighth decoders 325, 326, 327, and 328) connected with subpixels arranged in the second display area 162 and may supply the generated common analog gamma voltage to the fifth, sixth, seventh, and eighth decoders 325, 326, 327, and 328.

In conjunction with gamma voltage supply control of the gamma generator 208_1, the source driver 206 may include a plurality of switches. For example, the source driver 206 may further include a switch disposed between the output terminal of the first gamma generator 208a and the fifth decoder 325, a switch disposed between the output terminal of the first gamma generator 208a and the seventh decoder 327, a switch disposed between the output terminal of the second gamma generator 208c and the sixth decoder 326, and a switch disposed between the output terminal of the second gamma generator 208c and the eighth decoder 328. Furthermore, the source driver 206 may further include a switch disposed at the output terminal of the extra gamma generator 208e. The switches may be turned on or off under control of the timing controller. For example, the switches connected with the output terminal of the first gamma generator 208a and the output terminal of the second gamma generator 208c may have a turn-off state and the switch disposed at the output terminal of the extra gamma generator 208e may have a turn-on state, at a timing when an analog gamma voltage is supplied to the second display area 162. According to an embodiment, the switches connected with the output terminal of the first gamma generator 208a and the output terminal of the second gamma generator 208c may have a turn-on state and the switch disposed at the output terminal of the extra gamma generator 208e may have a turn-off state, at a timing when an analog gamma voltage is supplied to the first display area 161.

The fifth, sixth, seventh, and eighth decoders 325, 326, 327, and 328 may receive an output of the logic circuit (e.g., the second logic circuit 202b) and an output of the gamma generator 208_1 as inputs and may supply a signal to each of amplifiers. According to an embodiment, the fifth decoder 325 and the seventh decoder 327 may receive the analog gamma voltages of the first gamma generator 208a and the extra gamma generator 208e, the display data supplied by the second logic circuit 202b, and the digital gamma value for driving the corresponding subpixel. The sixth decoder 326 and the eighth decoder 328 may receive the analog gamma voltages of the second gamma generator 208c and the extra gamma generator 208e, the display data supplied by the second logic circuit 202b, and the digital gamma value for driving the corresponding subpixel.

Figure 7:
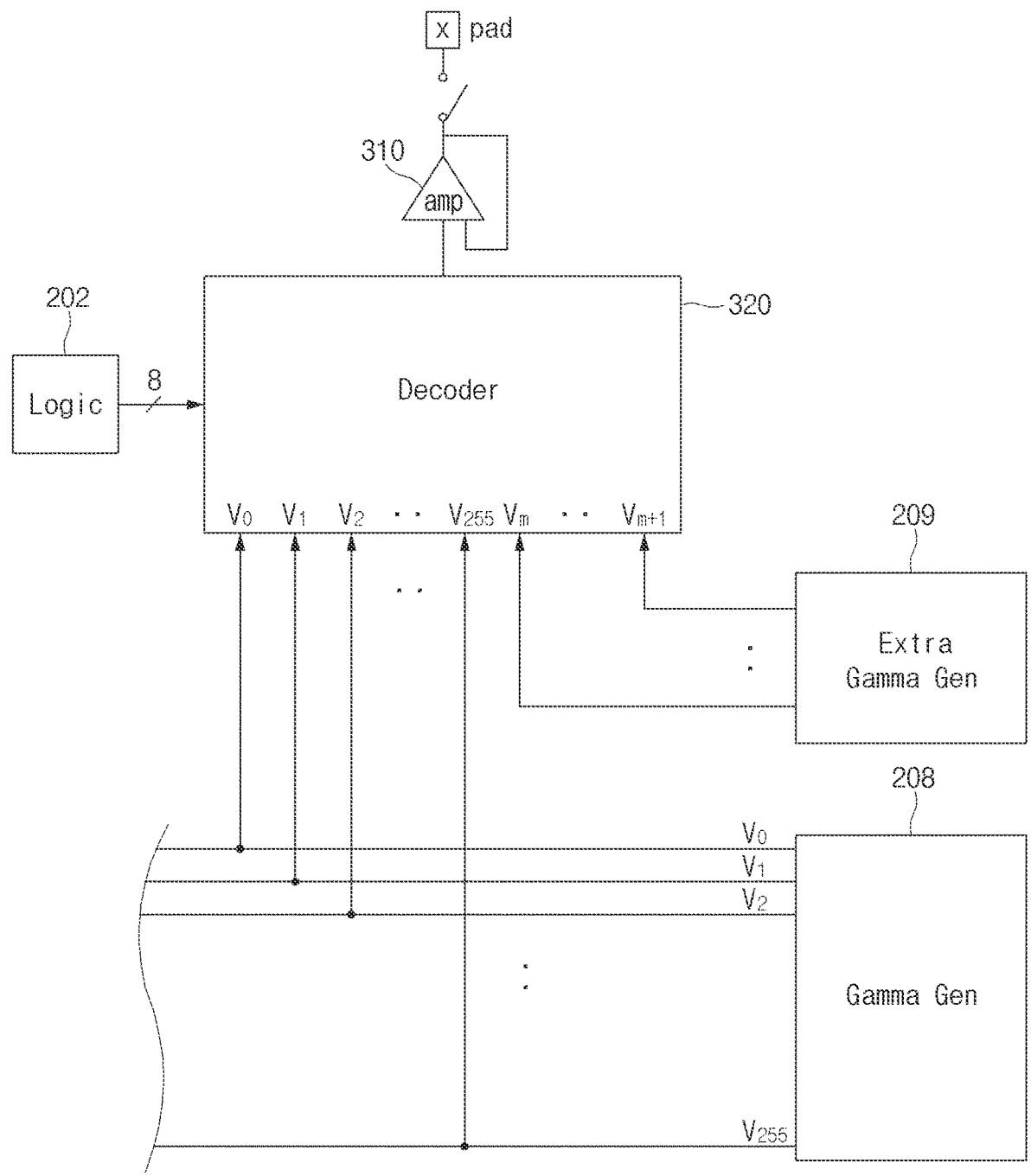
FIG. 7 is a drawing illustrating an example of some components of a display driver IC according to an embodiment of the disclosure.

FIG. 7 is a drawing illustrating an example of some components of a display driver IC according to an embodiment of the disclosure.

Referring to FIG. 7, some components of a display driver IC 200 according to an embodiment may include a gamma generator 208, an extra gamma generator 209, a decoder 320, a logic circuit 202, and an amplifier 310.

The amplifier 310 may include at least one amplifier disposed on a source driver. An output of the amplifier 310 may be supplied to a display panel 160 through a pad. The amplifier 310 may receive an output of the decoder 320 and may amplify and supply the received output at a specified rate to the display panel 160.

The logic circuit 202 may supply display data and a digital gamma value to the decoder 320 and may supply a control signal for controlling the output of the decoder 320. According to an embodiment, the logic circuit 202 may supply a control signal of 8 bits or more to the decoder 320.

The decoder 320 may receive an output of the logic circuit 202 and an output of the gamma generator 208 or an output of the extra gamma generator 209 and may output a specified signal value to the amplifier 310 based on the received output. According to an embodiment, the decoder 320 may receive, for example, outputs (e.g., V0, V1, V2, . . . , and V255) of the gamma generator 208 as inputs. Furthermore, the decoder 320 may receive outputs (e.g., Vm, . . . , and Vm+1) of the extra gamma generator 209 as inputs. The decoder 320 may be any one of decoders which are arranged on the source driver and are connected for each subpixel.

The gamma generator 208 may generate an analog gamma voltage corresponding to a specified gray value and may supply the generated analog gamma voltage to the decoder 320. For example, when the display panel 160 is configured to apply 256 gray values, the gamma generator 208 may include 256 signal lines to supply an analog gamma voltage corresponding to the 256 gray values to the decoder 320.

The extra gamma generator 209 may generate an analog gamma voltage of subpixels arranged in the second display area 162 in the display panel 160 and may supply the generated analog gamma voltage to the decoder 320. The number of gray values of the analog gamma voltage generated by the extra gamma generator 209 may vary depending on a setting. For example, the extra gamma generator 209 may generate any one of the 256 analog gamma voltages to be the same as the gamma generator 208. Herein, the analog gamma value generated by the extra gamma generator 209 may differ in magnitude from the analog gamma value generated by the gamma generator 208. For example, the analog gamma value generated by the extra gamma generator 209 may be greater in magnitude than (e.g., more than twice) the analog gamma value generated by the gamma generator 208. According to various embodiments, the number of gray values generated by the extra gamma generator 209 may be a number less than 256, for example, 128. The 128 gray values may include, for example, gray values of a relatively high gray scale. Thus, when there is a need to represent a gray value of a specific magnitude or more (e.g., an analog gamma voltage of gray level 128 or more) on the second display area 162 under control of a processor 140, the extra gamma generator 209 may generate and supply an analog gamma voltage to the decoder 320. According to an embodiment, when there is a need to represent a gray value of less than the specified magnitude (e.g., an analog gamma voltage of gray level 127 or less) on the second display area 162, the gamma generator 208 may generate and supply an analog gamma voltage to the decoder 320 under control of the processor 140.

Figure 8:
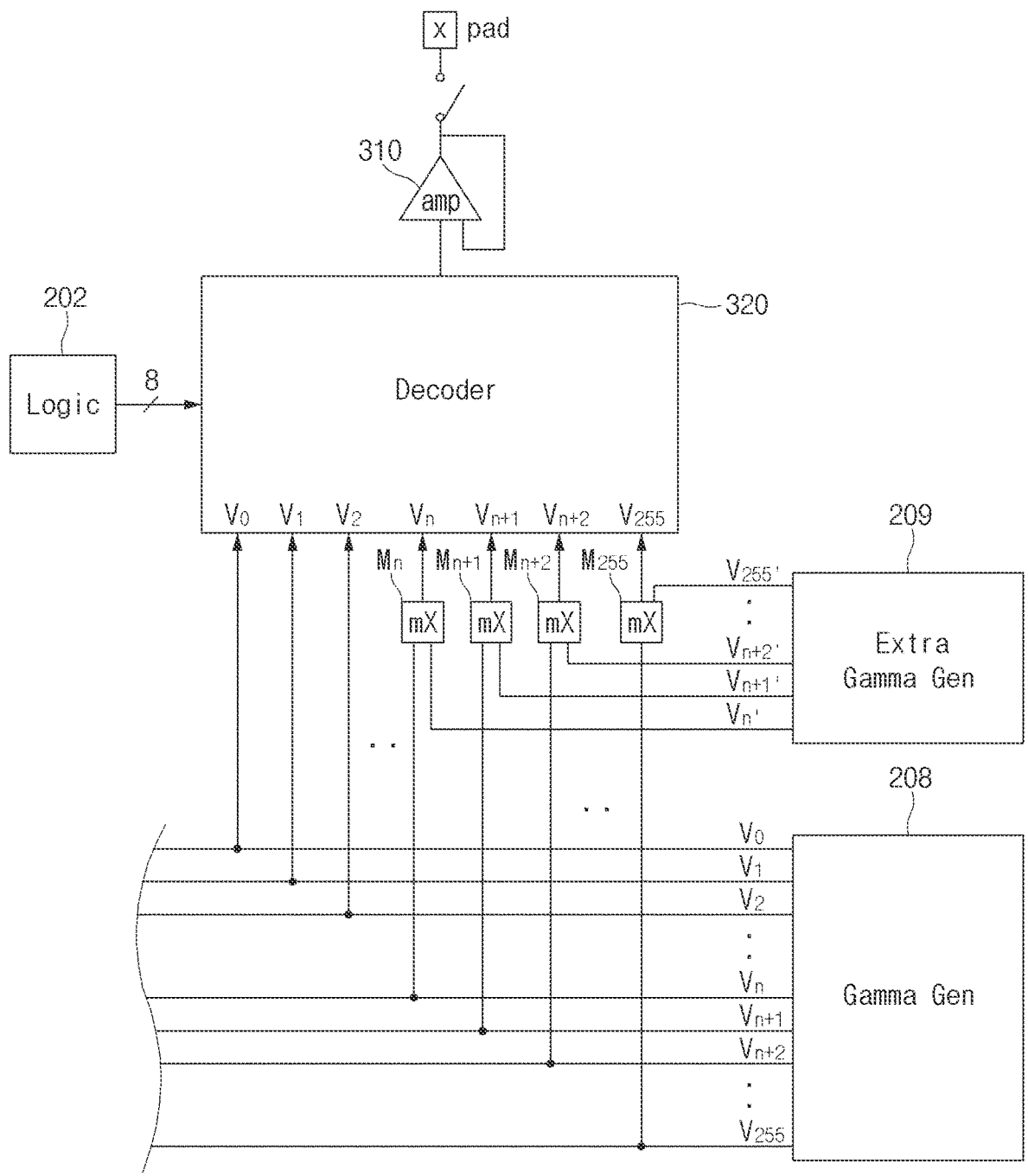
FIG. 8 is a drawing illustrating another example of some components of a display driver IC according to an embodiment of the disclosure.

FIG. 8 is a drawing illustrating another example of some components of a display driver IC according to an embodiment of the disclosure.

Referring to FIG. 8, some components of a display driver IC 200 according to an embodiment may include a gamma generator 208, an extra gamma generator 209, a decoder 320, a logic circuit 202, and an amplifier 310.

The amplifier 310 may include at least one amplifier for each subpixel disposed on a source driver. An output of the amplifier 310 may be supplied to a display panel 160 through a pad. The amplifier 310 may receive an output of the decoder 320 and may amplify and supply the received output at a specified rate to the display panel 160.

The logic circuit 202 may supply display data and a digital gamma value to the decoder 320 and may supply a control signal for controlling the output of the decoder 320. According to an embodiment, the logic circuit 202 may supply an 8-bit control signal to the decoder 320. The logic circuit 202 may control the signal generated by the extra gamma generator 209 to be supplied at a timing when the signal is supplied to the second display area 162 and may control the signal generated by the gamma generator 208 to be supplied at a timing when the signal is supplied to the first display area 161.

The decoder 320 may receive an output of the logic circuit 202 and an output of the gamma generator 208 or an output of the extra gamma generator 209 and may output a specified signal value to the amplifier 310 based on the received output. According to an embodiment, the decoder 320 may receive, for example, outputs (e.g., V0, V1, V2, . . . , and V255) of the gamma generator 208 as inputs. Furthermore, the decoder 320 may receive outputs (e.g., Vm, . . . , and Vm+1) of the extra gamma generator 209 as inputs. The decoder 320 may be any one of decoders which are arranged on the source driver and are connected for each subpixel. Some of inputs from the gamma generator 208 of the decoder 320 may overlap inputs from the extra gamma generator 209. A signal of any one of the gamma generator 208 and the extra gamma generator 209 may be supplied as the input of the decoder 320. In this regard, some of outputs of the gamma generator 208 may be connected with the output of the extra gamma generator 209 and multiplexers (MUXs) (or switches). The MUXs Mn, Mn+1, Mn+2, . . . , and M255 may have a number corresponding to the number of outputs of the extra gamma generator 209.

The gamma generator 208 may generate an analog gamma voltage corresponding to the specified gray value and may supply the generated analog gamma voltage to the decoder 320. For example, when the display panel 160 is configured to apply 256 gray values, the gamma generator 208 may include 256 signal lines to supply an analog gamma voltage corresponding to the 256 gray values to the decoder 320.

The extra gamma generator 209 may generate an analog gamma voltage of subpixels arranged in the second display area 162 in the display panel 160 and may supply the generated analog gamma voltage to the decoder 320. At this time, the output of the extra gamma generator 209 may overlap some outputs of the gamma generator 208, and any one output may be supplied to the decoder 320 through the MUXs Mn, Mn+1, Mn+2, . . . , and M255. The number of gray scales generated by the extra gamma generator 209 may vary depending on a setting value. For example, the extra gamma generator 209 may generate and supply any one of analog gamma values (e.g., gray level 128 or more) corresponding to gray values of a relatively high gray scale to the decoder 320. Although displayed with the same gray scale, the analog gamma value generated by the extra gamma generator 209 may differ in magnitude from the analog gamma value generated by the gamma generator 208.

Figure 9:
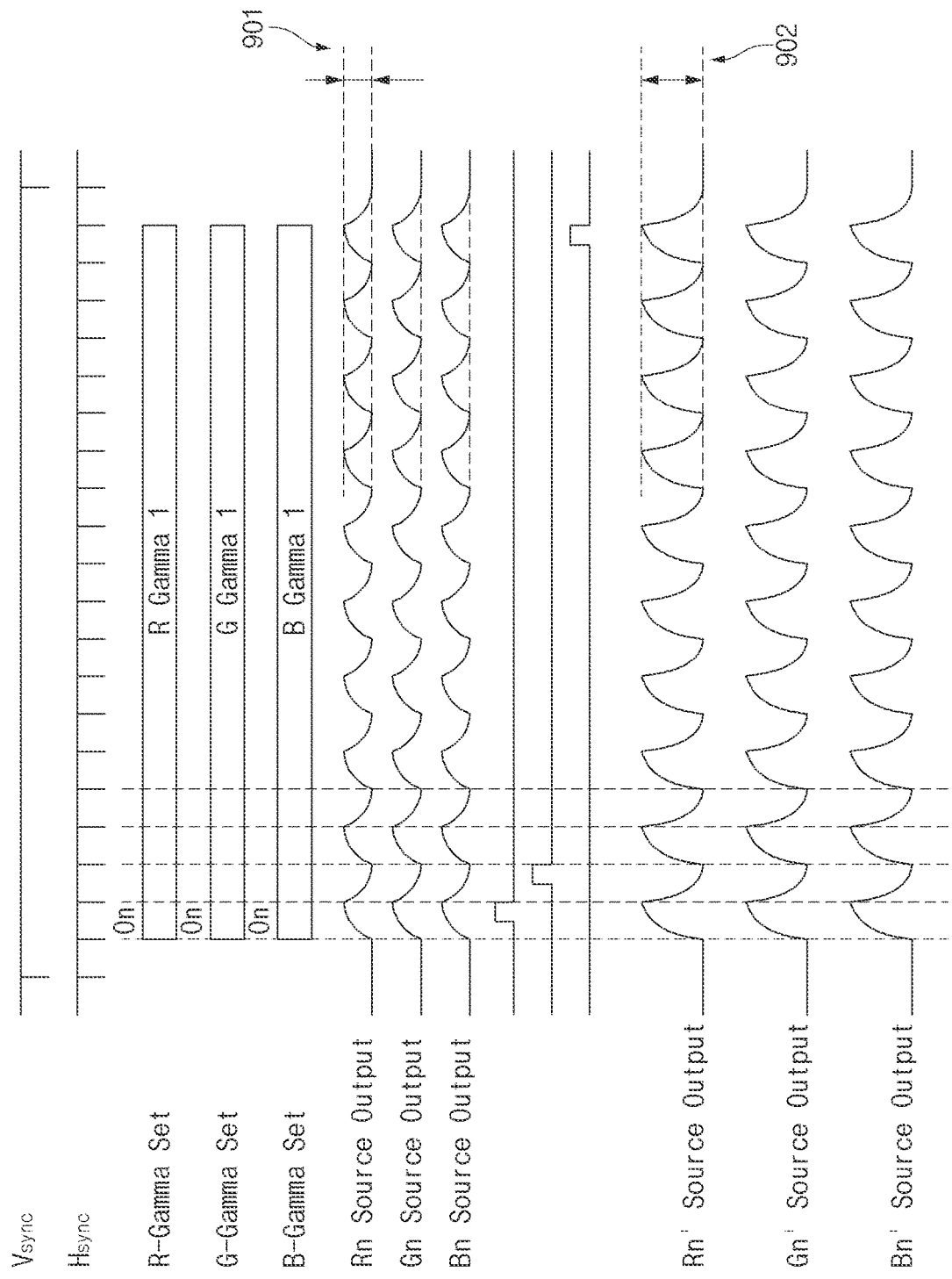
FIG. 9 is a drawing illustrating an example of an output of a source driver according to an embodiment of the disclosure.

FIG. 9 is a drawing illustrating an example of an output of a source driver according to an embodiment of the disclosure.

Referring to FIG. 9, a source driver 206 may supply a signal to a display panel 160 depending on a plurality of horizontal synchronization signals during one vertical synchronization signal. An R, G, and B gamma set of the source driver 206 may maintain a turn-on state during a certain number of horizontal synchronization signals. A source signal corresponding to Rn Source Output, Gn Source Output, or Bn Source Output may be supplied to the first display area 161. The output amplitude of the source signal supplied to the first display area 161 may have, for example, a first magnitude 901 A source signal corresponding to Rn' Source Output, Gn' Source Output, or Bn' Source Output may be supplied to the second display area 162. The output amplitude of the source signal supplied to the second display area 162 may have, for example, a second magnitude 902 greater than the first magnitude 901. A difference between the first magnitude 901 and the second magnitude 902 may vary depending on an arrangement density of pixels arranged in the second display area 162. Alternatively, the difference between the first magnitude 901 and the second magnitude 902 may vary depending on a brightness of displayed content. Alternatively, the difference between the first magnitude 901 and the second magnitude 902 may vary depending on external illumination intensity. The difference between the first magnitude 901 and the second magnitude 902 may be larger when displaying relatively bright content or high grayscale content than when displaying relatively dark content or low grayscale content.

Figure 10:
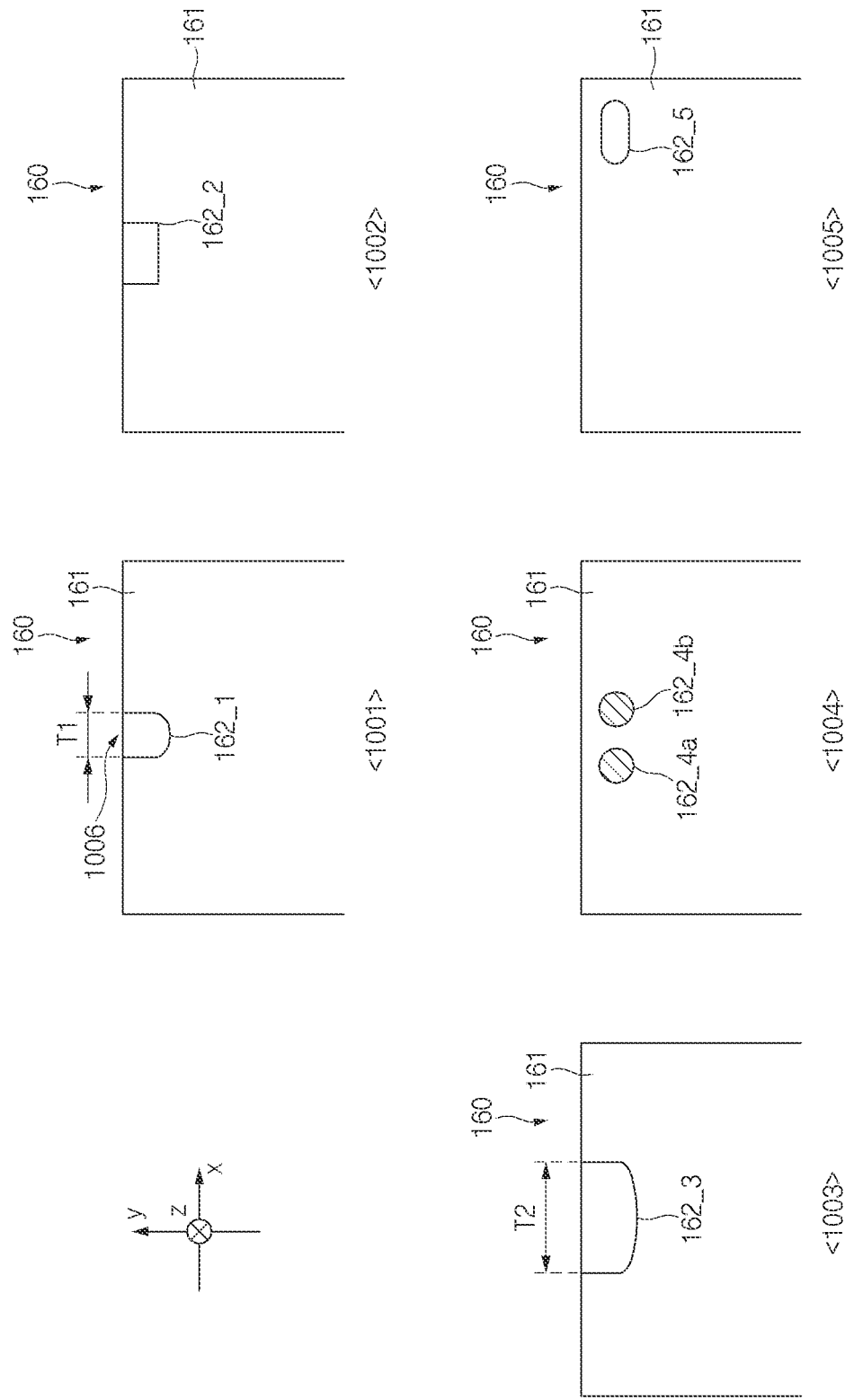
FIG. 10 is a drawing illustrating an example of a display panel including various shapes of second display areas according to an embodiment of the disclosure.

FIG. 10 is a drawing illustrating an example of a display panel including various shapes of second display areas according to an embodiment of the disclosure.

Referring to FIG. 10, in 1001 state, a display panel 160 according to an embodiment may include a first display area 161 and a second display area 162_1 including a certain size in the center of the top. The second display area 162_1 may include, for example, a first width T1 in a horizontal direction (e.g., an x-axis direction) with respect to the illustrated drawing and may have a certain length in a vertical direction (e.g., a y-axis direction). At least a portion of the second display area 162_1 may include a portion of the upper edge of the display panel 160. For example, at least one sensor (e.g., a camera sensor, a fingerprint sensor, a proximity sensor, or an iris sensor) of an electronic device 100 may be disposed in a lower portion (e.g., a z-axis direction) of the second display area 162_1. In the second display area 162_2, the other portion except for a portion 1006 adjacent to an edge portion of the display panel 160 may be rounded. The second display area 162_1 may be disposed such that the other area except for the edge adjacent portion 1006 of the display panel 160 is surrounded by the first display area 161.

In state 1002, the display panel 160 according to an embodiment may include the first display area 161 and a second display area 162_2 including a certain size in the center of the top. A portion of the upper end of the second display area 162_2 may include a portion of the upper edge of the display panel 160. A portion of the upper edge of the second display area 162_2 may be included, and it may be formed in the shape of a rectangle as a whole.

In state 1003, the display panel 160 according to an embodiment may include the first display area 161 and a second display area 162_3 including a certain size in the center of the top. A portion of the upper end of the second display area 162_3 may include a portion of the upper edge of the display panel 160. A portion of the upper edge of the second display area 162_3 may be formed with a second width T2. The second display area 162_3 may be formed in the shape of a rectangle as a whole and may be rounded.

In state 1004, the display panel 160 according to an embodiment may include the first display area 161 and a 21st display area 162_4a and a 22nd display area 162_4b including a certain size in the center of the top. Each of the 21st display area 162_4a and the 22nd display area 162_4b may have a circular shape of a certain size. The 21st display area 162 4a and the 22nd display area 162_4b may be arranged to be surrounded by the first display area 161. The 21st display area 162_4a and the 22nd display area 162_4b may be arranged at a certain interval. Sensors may be arranged on a lower portion (a z-axis direction) of each of the 21st display area 162 4a and the 22th display area 162_4b.

In state 1005, the display panel 160 according to an embodiment may include the first display area 161 and a second display area 162_5 including a certain size at a right side of the top. The second display area 162_5 may be provided in the shape of an oval of a certain size where an x-axis is longer than a y-axis or in the form of a rectangle, edges of which are rounded. A plurality of sensors may be arranged in a lower portion (a z-axis direction) of the second display area 162_5. For example, a fingerprint sensor and a camera may be arranged in a lower portion of the second display area 162_5. Alternatively, an iris sensor and an RGB camera may be arranged in a lower portion of the second display area 162_5.

Figure 11:
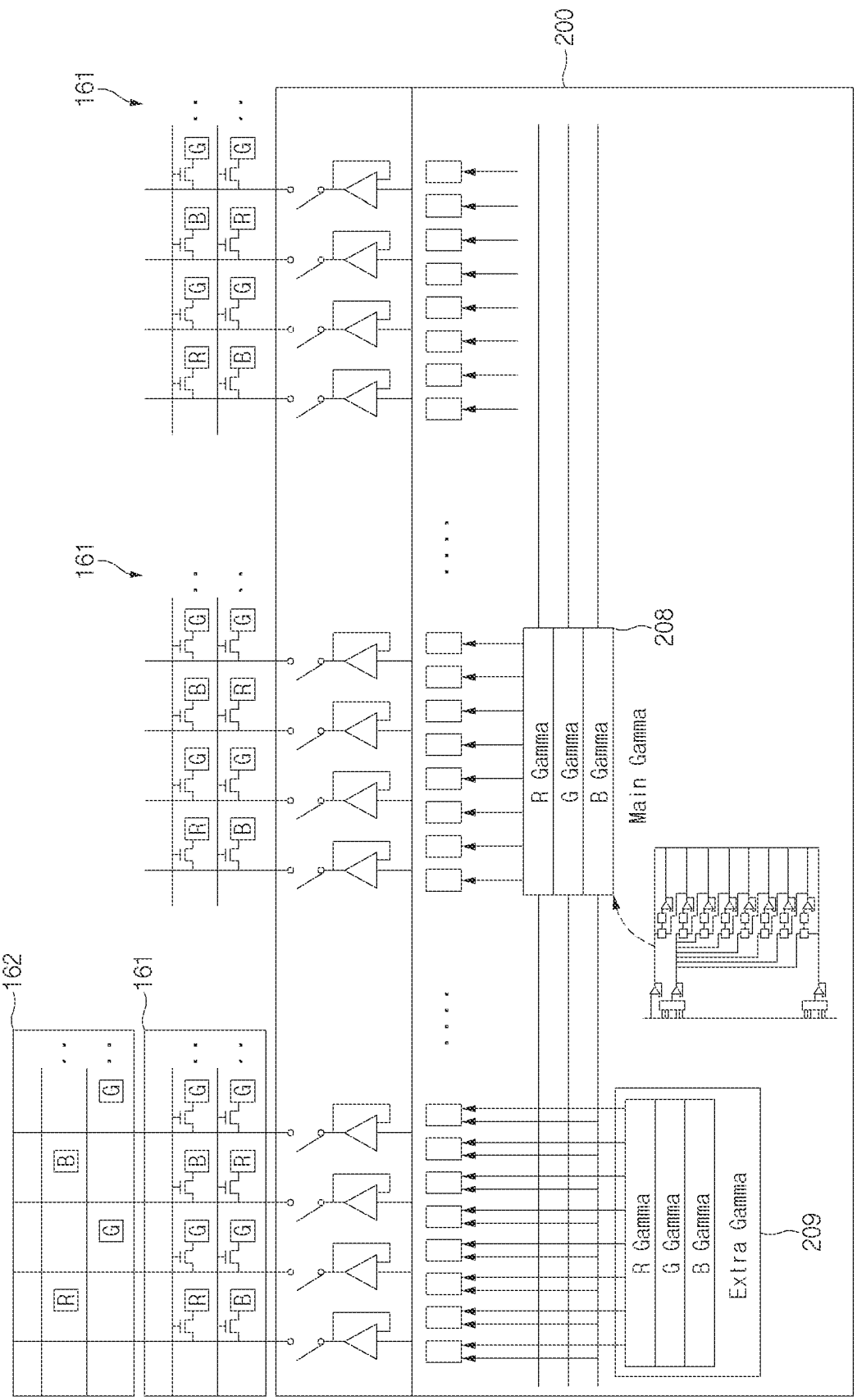
FIG. 11 is a drawing illustrating an example where an extra gamma driving unit is disposed at a left side in a display driver IC according to an embodiment of the disclosure.

FIG. 11 is a drawing illustrating an example where an extra gamma driving unit is disposed at a left side in a display driver IC according to an embodiment of the disclosure.

Referring to FIG. 11, as described above, a display driver IC 200 may include a logic circuit 220, a source driver 206, a gate driver 207, and a graphic memory 203. In the illustrated drawing, for convenience of description, only some components including a gamma generator 208 and an extra gamma generator 209 are illustrated. A display panel 160 may include, for example, an area where a second display area 162 having a relatively lower pixel arrangement density and a first display area 161 having a relatively higher pixel arrangement density share the same source line and an area including only the first display area 161. In the illustrated drawing, the shape where the second display area 162 and the first display area 161 are arranged in a left area of the display panel 160 is illustrated.

In the display driver IC 200, the extra gamma generator 209 may be disposed to be biased to the left to optimize a supply route of an analog gamma voltage. An analog gamma voltage generated by the extra gamma generator 209 may be supplied to decoders of a source driver associated with the second display area 162 at a timing when a signal is supplied to the second display area 162. The gamma generator 208 may be disposed in, for example, a central portion of the display driver IC 200 to generate and supply an analog gamma voltage to decoders associated with the first display area 161 which is evenly disposed from left and right. At least one sensor may be disposed in a lower portion of the second display area 162 (e.g., a direction opposite to a direction where light is radiated from the display panel 160). The first display area 161 of the display panel 160 may be evenly disposed in the entire display panel 160, and at least a portion of the second display area 162 may be disposed in the first display area 161. Thus, the at least a portion of the second display area 162 may be disposed to be surrounded by the first display area 161.

Figure 12:
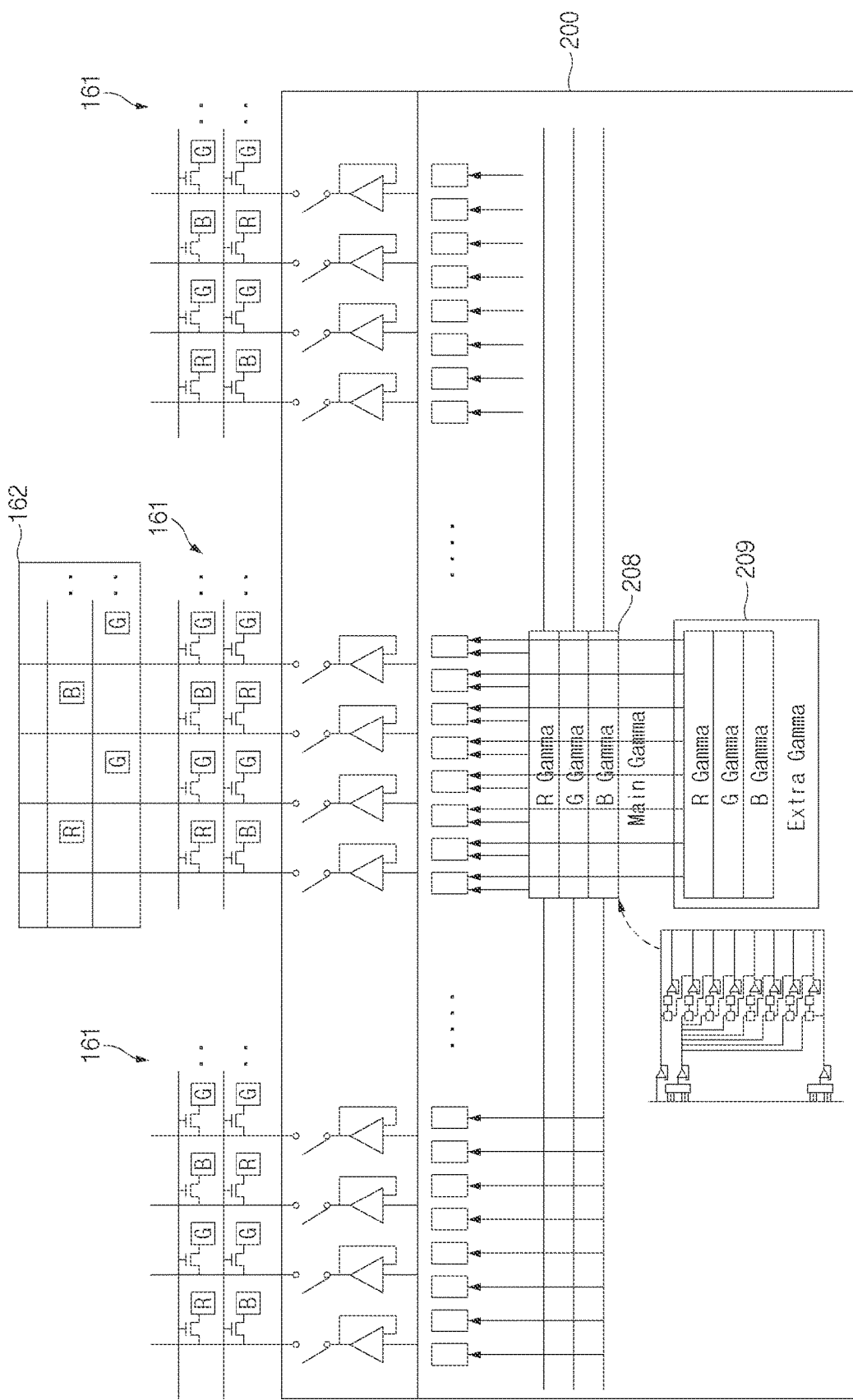
FIG. 12 is a drawing illustrating an example where an extra gamma driving unit is disposed in the center in a display driver IC according to an embodiment of the disclosure.

FIG. 12 is a drawing illustrating an example where an extra gamma driving unit is disposed in the center in a display driver IC according to an embodiment of the disclosure.

Referring to FIG. 12, as described above, a display driver IC 200 may include a logic circuit 220, a source driver 206, a gate driver 207, and a graphic memory 203. In the illustrated drawing, for convenience of description, only some components including a gamma generator 208 and an extra gamma generator 209 are illustrated. A display panel 160 may include, for example, an area where a second display area 162 having a relatively lower pixel arrangement density and a first display area 161 having a relatively higher pixel arrangement density share the same source line and an area including only the first display area 161. In the illustrated drawing, the shape where the second display area 162 and the first display area 161 are arranged in a central area of the display panel 160 is illustrated.

To optimize a supply route of an analog gamma voltage, an extra gamma generator 209 may be disposed in the center of the display driver IC 200 to supply an analog gamma voltage to the second display area 162 disposed in the center of the display panel 160. An analog gamma voltage generated by the extra gamma generator 209 may be supplied to decoders of a source driver associated with the second display area 162 at a timing when a signal is supplied to the second display area 162. The gamma generator 208 may be disposed in, for example, the center of the display driver IC 200 to generate and supply an analog gamma voltage to decoders associated with the first display area 161 which is evenly disposed from left and right. Thus, the gamma generator 208 and the extra gamma generator 209 may be arranged in parallel in the center. For example, a camera may be disposed in a lower portion of the second display area 162 (e.g., a direction opposite to a direction where light is radiated from the display panel 160), and the second display area 162 may be disposed to be biased to an upper end of the display panel 160.

Figure 13:
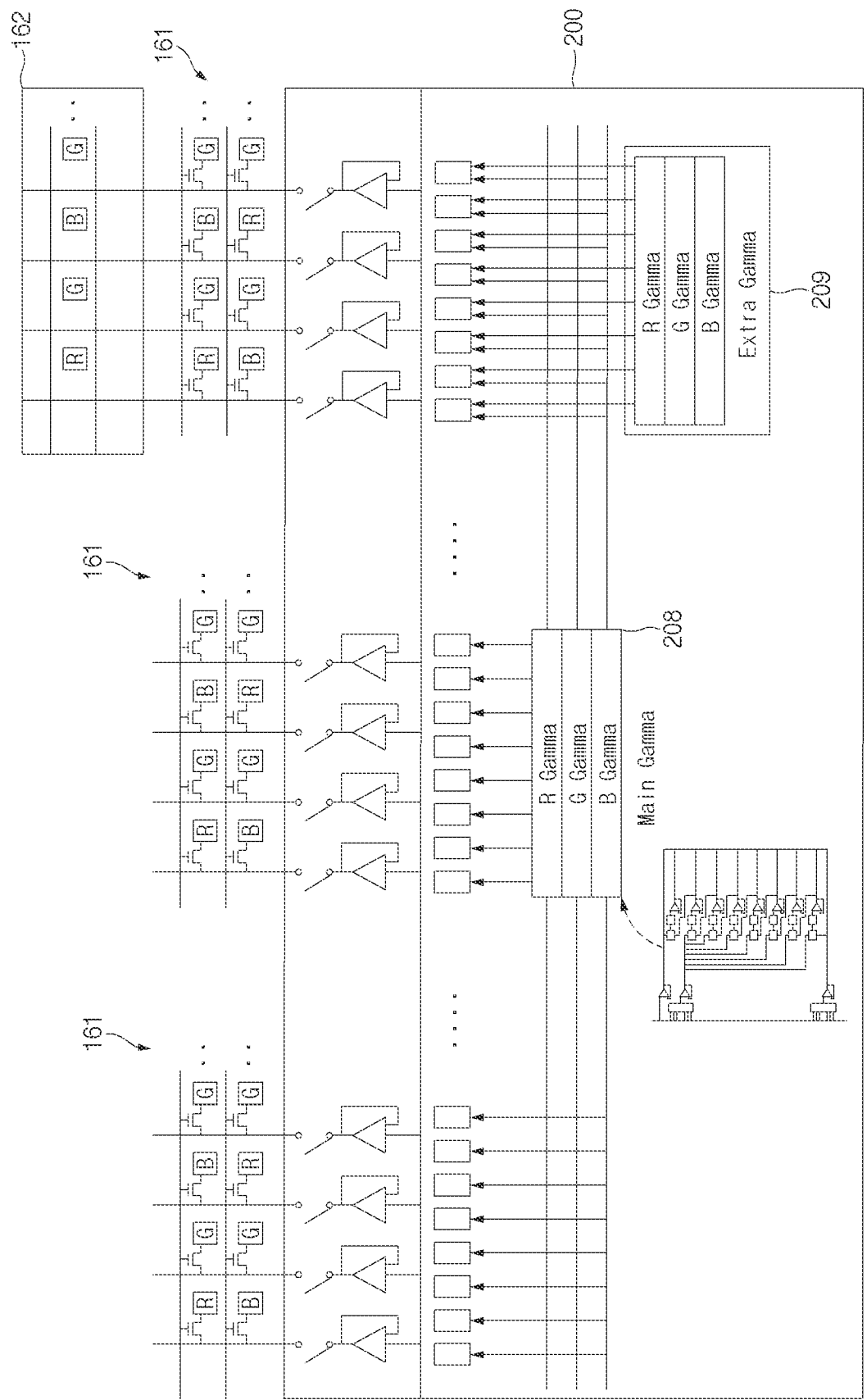
FIG. 13 is a drawing illustrating an example where an extra gamma driving unit is disposed at a right side in a display driver IC according to an embodiment of the disclosure.

FIG. 13 is a drawing illustrating an example where an extra gamma driving unit is disposed at a right side in a display driver IC according to an embodiment of the disclosure.

Referring to FIG. 13, as described above, a display driver IC 200 may include a logic circuit 220, a source driver 206, a gate driver 207, and a graphic memory 203. In the illustrated drawing, for convenience of description, only some components including a gamma generator 208 and an extra gamma generator 209 are illustrated. A display panel 160 may include a first display area 161 having a first pixel arrangement density and a second display area 162 having a second pixel arrangement density lower than the first pixel arrangement density. Some of source lines which supply a source signal may be arranged in only the first display area 161, and the others may be arranged in the first display area 161 and the second display area 162. In the illustrated drawing, the shape where the second display area 162 and the first display area 161 are arranged in a right area of the display panel 160 is illustrated.

To optimize a supply route of an analog gamma voltage, an extra gamma generator 209 may be disposed at a right side of the display panel 160 to supply the analog gamma voltage to the second display area 162 disposed at the right side of the display panel 160. An analog gamma voltage generated by the extra gamma generator 209 may be supplied to decoders of a source driver associated with the second display area 162 at a timing when a signal is supplied to the second display area 162. The gamma generator 208 may be disposed in, for example, the center of the display driver IC 200 to generate and supply an analog gamma voltage to decoders associated with the first display area 161 which is evenly disposed from left and right. For example, an iris sensor or an RGB camera may be arranged in a lower portion of the second display area 162 (e.g., a direction opposite to a direction where light is radiated from the display panel 160), and the second display area 162 may be disposed to be biased to a right upper end of the display panel 160.

Figure 14:
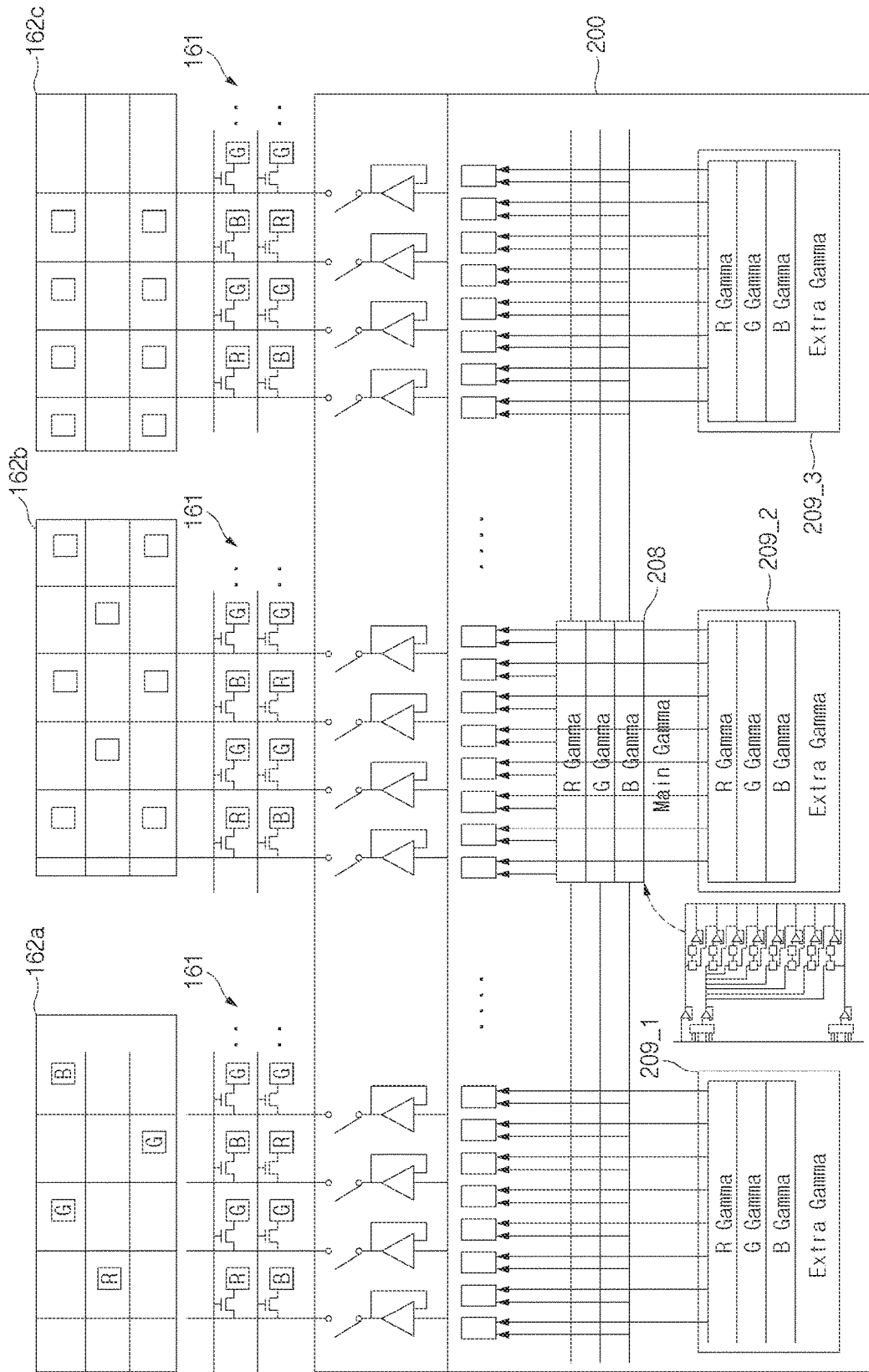
FIG. 14 is a drawing illustrating an example where an extra gamma driving unit is disposed at various locations in a display driver IC according to an embodiment of the disclosure.

FIG. 14 is a drawing illustrating an example where an extra gamma driving unit is disposed at various locations in a display driver IC according to an embodiment of the disclosure.

Referring to FIG. 14, as described above, a display driver IC 200 may include a logic circuit 220, a source driver 206, a gate driver 207, and a graphic memory 203. In the illustrated drawing, for convenience of description, only some components including a gamma generator 208 and an extra gamma generator 209 are illustrated. A display panel 160 may include a first display area 161 having a first pixel arrangement density and 21st, 22nd, and 23rd display areas 162a, 162b, and 162c having a second pixel arrangement density lower than the first pixel arrangement density. Pixel arrangement densities of the 21st, 22nd, and 23rd display areas 162a, 162b, and 162c may be formed differently from each other. For example, it may be formed such that a pixel arrangement density of a display area in which an RGB camera is disposed in a lower portion is relatively lowest and such that a pixel arrangement density of a display area in which an illumination sensor or a proximity sensor is disposed in a lower portion is relatively highest. In the illustrated drawing, the shape where the 21st display area 162a is disposed in a left area of the display panel 160, where the 22nd display area 162b is disposed in a central area, and where the 23rd display area 162c is disposed in a right area is illustrated. As the first display area 161 is disposed in an area adjacent to each of the 21st, 22nd, and 23rd display areas 162a, 162b, and 162c, source lines which supply a source signal to the 21st, 22nd, and 23rd display areas 162a, 162b, and 162c may be arranged to supply the source signal to the 21st, 22nd, and 23rd display areas 162a, 162b, and 162c through the first display area 161. According to various embodiments, the 22nd display area 162b may be disposed to be biased to a lower portion of the display panel 160.

To optimize a supply route of an analog gamma voltage, extra gamma generators 209_1, 209_2, and 209_3 in the display driver IC 200 may be arranged on the display driver IC 200 of locations corresponding to the corresponding 21st, 22nd, and 23rd display areas 162a, 162b, and 162c. For example, the first extra gamma generator 209_1 corresponding to the 21st display area 162a may be disposed to be biased to the left on the display driver IC 200, the second extra gamma generator 209_2 corresponding to the 22nd display area 162b may be disposed in the center on the display driver IC 200, and the third extra gamma generator 209_3 corresponding to the 23rd display area 162c may be disposed to be biased to the right on the display driver IC 200. Analog gamma voltages generated by the first, second, and third extra gamma generators 209_1, 209_2, and 209_3 may be set to different values according to a type or characteristic of an operated sensor. For example, in the 22nd display area 162b where the fingerprint sensor is disposed in the lower portion, when a fingerprint is sensed, it may be configured such that a relatively high analog gamma voltage is supplied to display content of a relatively higher luminance than a luminance of content displayed on the first display area 161. According to various embodiments, when the 21st display area 162a and the 23rd display area 162c are configured to have different pixel arrangement densities, an analog gamma voltage may be differently supplied in response to it (e.g., a voltage of a different magnitude is supplied although there is the same gray value). For example, as the density of the display area is relatively lower, an analog gamma voltage of a higher magnitude may be supplied. According to various embodiments, the electronic device may include gamma correction tables for respectively driving the first display area 161 and the 21st to 23rd display areas 162a to 162c (e.g., a first gamma correction table for driving the 21st display area 162a, a second gamma correction table for driving the 22nd display area 162b, a third gamma correction table for driving the 23rd display area 162c, and a gamma correction table for driving the first display area 161). According to various embodiments, a pixel arrangement density between the first display area 161 and the 21st display area 162a, between the first display area 161 and the 22nd display area 162b, or between the first display area 161 and the 23rd display area 162c may be different from a surrounding pixel arrangement density. For example, as the pixel density goes from the first display area 161 to the 21st display area 162a, the 22nd display area 162b, or the 23rd display area 162c, it may be gradually reduced. Alternatively, as the pixel density goes from the 21st display area 162a, the 22nd display area 162b, or the 23rd display area 162c to the first display area 161, it may be gradually reduced. Thus, the electronic device may provide a gradation effect in which a gray value is gradually changed in a boundary of at least one of the 21st display area 162a, the 22nd display area 162b, and the 23rd display area 162c. In this regard, the display driver IC 200 may generate and operate at least one gamma correction table corresponding to a pixel arrangement density in at least one of boundary areas between the first display area 161 and the 21st display area 162a, between the first display area 161 and the 22nd display area 162b, or between the first display area 161 and the 23rd display area 162c in response to the corresponding pixel arrangement density. Alternatively, the electronic device may previously generate or store at least one gamma correction table for a gradual screen change in the boundary areas (e.g., between the first display area 161 and the 21st display area 162a, between the first display area 161 and the 22nd display area 162b, or between the first display area 161 and the 23rd display area 162c) and may process pixel driving in the corresponding boundary area based on it. The at least one gamma correction table may be stored in, for example, a memory disposed in the display driver IC 200 or may be disposed in a memory accessible by an application processor. According to various embodiments, the electronic device may calculate an intermediate gamma value between a first gamma value for driving the first display area 161 and a second gamma value for driving the 21st display area 162a (or a second gamma value for driving the 22nd display area 162b or a second gamma value for driving the 23rd display area 162c) and may perform pixel driving in the boundary area based on it. According to various embodiments, the electronic device may generate a gradation mask in which a color is gradually changed in the boundary area in software and may apply it to the corresponding boundary area, thus providing the gradation effect.

Figure 15:
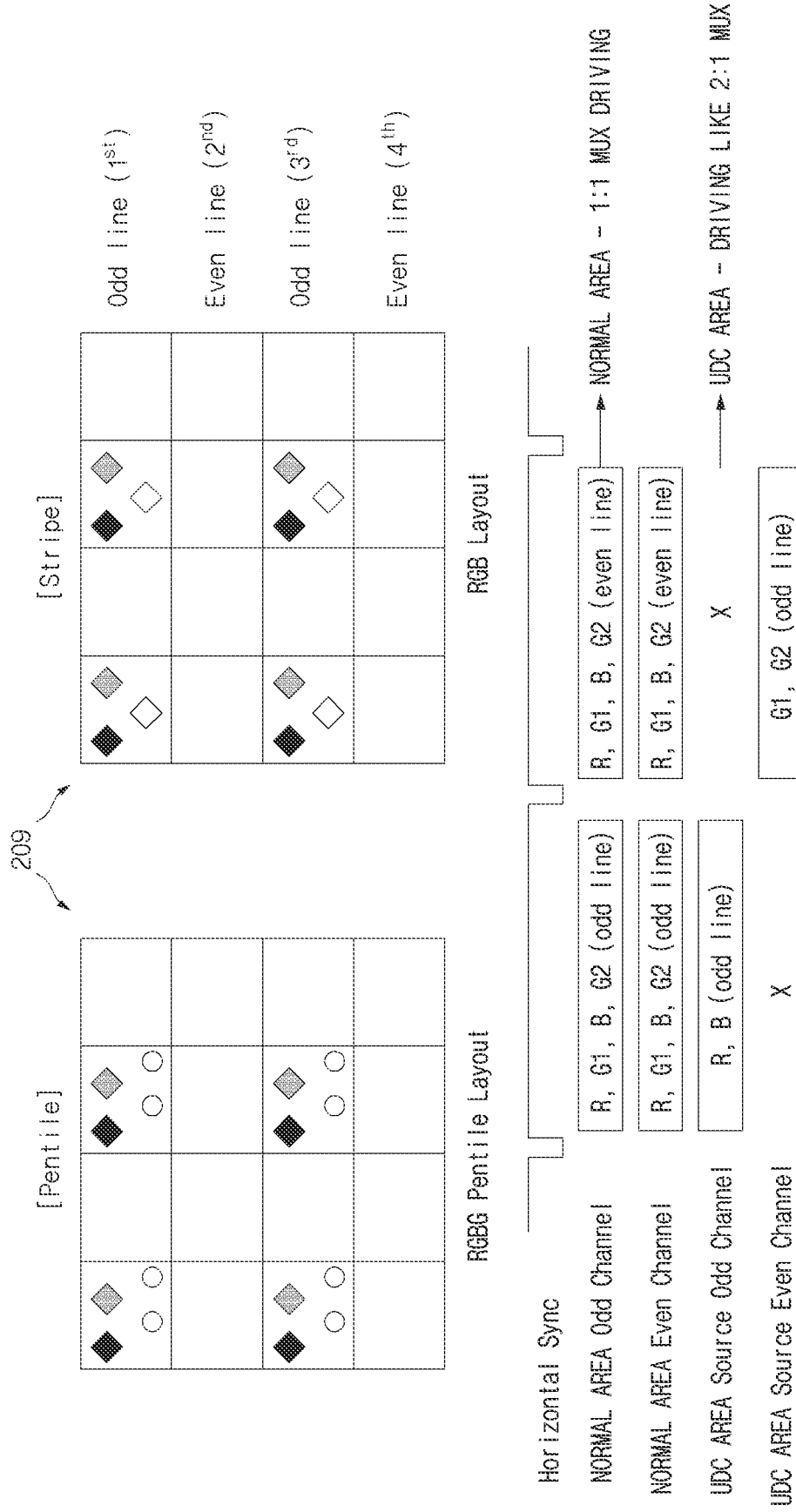
FIG. 15 is a drawing illustrating an example of driving of a display panel according to an embodiment of the disclosure.

FIG. 15 is a drawing illustrating an example of driving of a display panel according to an embodiment of the disclosure.

Referring to FIG. 15, as described above, a second display area 162 of a display panel 160 may have subpixel arrangement of a Pentile type. According to various embodiments, the second display area 162 of the display panel 160 may have subpixel arrangement of a stripe type as shown. In the second display area 162, pixels may be arranged in some of pixel deployable areas divided in the form of a matrix, and pixels may not be arranged in the other pixel deployable areas. For example, the second display area 162 may have a relatively lower pixel arrangement density than the first display area 161 in which pixels (or subpixels) are arranged in the form of a matrix without an empty area. Thus, for example, although a sensor is disposed in a lower portion of the second display area 162 (e.g., below a direction opposite to a direction where light is radiated from the display panel 160), it is possible to obtain an image of a resolution of a specified level or more. The pixels may be arranged like, for example, ¼, ⅜, or ½, in this case, the display panel 160 may drive the source once every two horizontal synchronization intervals (every horizontal time) and may ensure the maintenance of a scan on time of the OLED, thus implementing full content display by means of time division driving. In conjunction with driving the second display area 162 (or an area where a camera or the like is disposed in a lower portion of the display), the physical number of extra gamma generators 209 of a source driver 206 may be reduced to a half by driving (or generating and supplying) the time-divided source signal and the time-divided gamma voltage. For example, as shown, in the first display area 161, RGBG subpixels in which odd-numbered gate lines and even-numbered gate lines are alternately driven may be driven for each line. In the second display area 162, red and blue subpixels may be driven while an even-numbered gate line and an odd-numbered source line are driven, and two green subpixels may be driven while an odd-numbered gate line and an odd-numbered source line are driven. Thus, as the extra gamma generator 209 supplies an analog gamma voltage for controlling driving of some subpixels while a source line and a gate line are controlled to be alternately driven, it may perform driving using half the number of extra gamma driving units as compared with sequential driving.

According to the above-mentioned various embodiments, an electronic device according to an embodiment may include a display panel including a first display area and a second display area, the first display area including subpixels distributed at a first density and the second display area including subpixels distributed at a second density lower than the first density, and a display driver IC associated with driving the display panel. The display driver IC may include a gamma generator for supplying a gamma signal to source lines arranged in the first display area and an extra gamma generator for supplying a gamma signal to source lines arranged in common in the second display area and the first display area. The extra gamma generator may be configured to supply a gamma signal set to have a relatively higher luminance value than a gamma signal supplied to the first display area to the second display area.

According to various embodiments, at least some of at least one sensor may be arranged below the second display area, in the direction of looking down at the display panel, when looking down at the display panel (or when looking down at an upper surface of the display panel).

According to various embodiments, the at least one sensor may include an RGB camera.

According to various embodiments, the at least one sensor may include a fingerprint sensor.

According to various embodiments, the first display area may be disposed to surround at least one surface of the second display area (or at least a portion of the periphery of the second display area).

According to various embodiments, the extra gamma generator may be configured to supply a common gamma voltage signal of the same magnitude to the respective subpixels arranged in the second display area.

According to various embodiments, the extra gamma generator may include a first extra gamma generator for generating a red gamma signal set to display a relatively higher luminance than a red subpixel disposed in the first display area, a second extra gamma generator for generating a green gamma signal set to display a relatively higher luminance than a green subpixel disposed in the first display area, and a third extra gamma generator for generating a blue gamma signal set to display a relatively higher luminance than a blue subpixel disposed in the first display area.

According to various embodiments, the gamma generator may include a first gamma generator for supplying a gamma signal to a red subpixel and a blue subpixel arranged in the first display area and a second gamma generator for supplying a gamma signal to green subpixels arranged in the first display area. The extra gamma generator may be disposed adjacent to the gamma generator and may be configured to supply a gamma signal in common to a red subpixel, a green subpixel, and a blue subpixel arranged in the second display area.

According to various embodiments, the gamma generator may be disposed in the center of the display driver IC, and the extra gamma generator may be disposed in a location in the display driver IC, which corresponds to a location of a signal line for supplying a signal to the second display area. Alternatively, the location of the extra gamma generator in the display driver IC may correspond to the location of the signal line for supplying the signal to the second display area.

According to various embodiments, the second display area may be disposed in at least one of a left edge, a center, and a right edge of the display panel, and the extra gamma generator may be disposed in at least one of a left edge, a center, and a right edge of the display driver IC. According to various embodiments, the second display area may be disposed in at least one of a left edge, a center, and a right edge around the center of the display panel, when the display panel is a polygon (e.g., a rectangle) or a circle. The extra gamma generator may be adjacent to the second display area and may be disposed in at least one of the left edge, the center, and the right edge.

According to various embodiments, the display driver IC may alternately operate an odd-numbered gate line and an odd-numbered source line of the second display area and an even-numbered gate line and an even-numbered source line of the second display area.

According to various embodiments, the display driver IC may include source lines for supplying a signal to the first display area and the second display area, amplifiers connected with the source lines, and decoders connected with the amplifiers. The decoders may receive gray values of the gamma generator and the extra gamma generator as inputs and may output any one of the received gray values to the amplifier.

According to various embodiments, the display driver IC may further include source lines for supplying a signal to the first display area and the second display area, amplifiers connected with the source lines, decoders connected with the amplifiers, and a plurality of multiplexers for multiplexing some outputs of the gamma generator and an output of the extra gamma generator and supplying a gamma signal of the gamma generator or a gamma signal of the extra gamma generator to the decoders under control.

According to various embodiments, a first magnitude of a source signal output of the first display area and a second magnitude of a source signal output of the second display area may be different from each other.

According to various embodiments, a difference between the first magnitude and the second magnitude may correspond to a difference between a density of subpixels of the first display area and a density of subpixels of the second display area. According to various embodiments, the difference between the density of the subpixels of the first display area and the density of subpixels of the second display area may be large when the difference between the first magnitude and the second magnitude is large, and the difference between the density of the subpixels of the first display area and the density of the subpixels of the second display area may be small when the difference between the first magnitude and the second magnitude is small. As an example of such a configuration, it may be set to an opposite case (e.g., the difference between the magnitudes may be small when the difference between the densities is large, and the difference between the magnitudes may be large when the difference between the densities is small).

According to various embodiments, the display driver IC may control a magnitude of a source signal output of the second display area such that colors and luminances of the same content output to the first display area and the second display area are shown to be the same as or similar to each other.

According to the above-mentioned various embodiments, an operation method for a gamma voltage according to a display area according to an embodiment may include receiving, by a display driver IC, display data from a processor and supplying, by the display driver IC, a second gamma signal set to display a luminance of a second magnitude greater than a first magnitude to a second display area having a second pixel arrangement density lower than a first pixel arrangement density, while supplying a first gamma signal set to display a luminance of the first magnitude to a first display area disposed at the first pixel arrangement density in a display panel.

According to various embodiments, the supplying of the second gamma signal may include supplying the second gamma signal having a voltage of the same magnitude in common to a red subpixel, a green subpixel, and a blue subpixel arranged in the second display area.

According to various embodiments, the supplying of the second gamma signal may include generating the second gamma signal for each subpixel disposed in the second display area and supplying the generated second gamma signal for each subpixel to source lines connected with the corresponding subpixel.

According to various embodiments, the supplying of the second gamma signal may include alternately supplying the second gamma signal to odd-numbered gate lines and odd-numbered source lines and even-numbered gate lines and even-numbered source lines arranged in the second display area.

Figure 16:
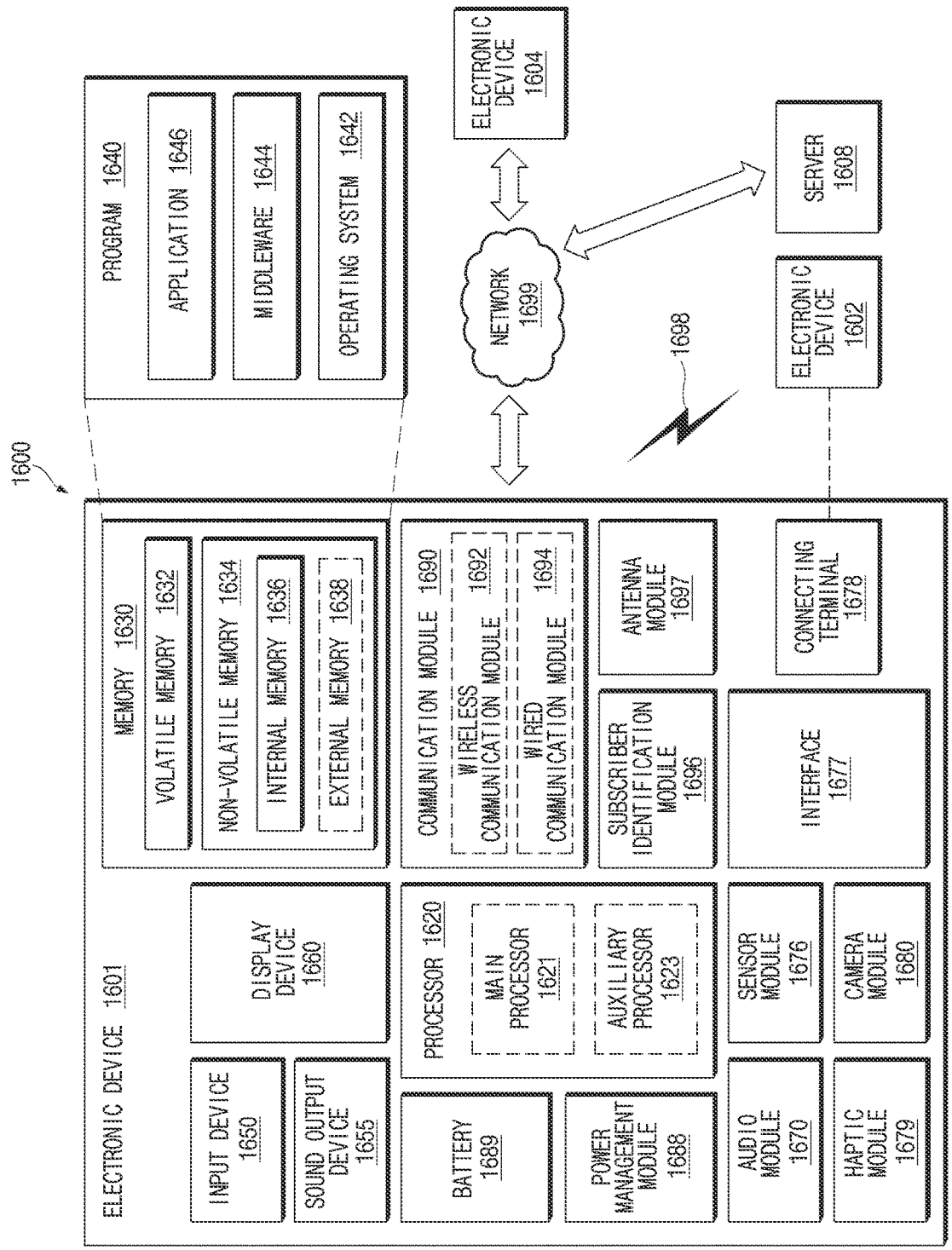
FIG. 16 is a block diagram illustrating an electronic device in a network environment according to an embodiment of the disclosure.

FIG. 16 is a block diagram illustrating an electronic device in a network environment according to an embodiment of the disclosure.

Referring to FIG. 16, an electronic device 1601 in a network environment 1600 may communicate with an electronic device 1602 via a first network 1698 (e.g., a short-range wireless communication network), or an electronic device 1604 or a server 1608 via a second network 1699 (e.g., a long-range wireless communication network). According to an embodiment, the electronic device 1601 may communicate with the electronic device 1604 via the server 1608. According to an embodiment, the electronic device 1601 may include a processor 1620, memory 1630, an input device 1650, a sound output device 1655, a display device 1660, an audio module 1670, a sensor module 1676, an interface 1677, a haptic module 1679, a camera module 1680, a power management module 1688, a battery 1689, a communication module 1690, a subscriber identification module (SIM) 1696, or an antenna module 1697. In some embodiments, at least one (e.g., the display device 1660 or the camera module 1680) of the components may be omitted from the electronic device 1601, or one or more other components may be added in the electronic device 1601. In some embodiments, some of the components may be implemented as single integrated circuitry. For example, the sensor module 1676 (e.g., a fingerprint sensor, an iris sensor, or an illuminance sensor) may be implemented as embedded in the display device 1660 (e.g., a display).

The processor 1620 may execute, for example, software (e.g., a program 1640) to control at least one other component (e.g., a hardware or software component) of the electronic device 1601 coupled with the processor 1620, and may perform various data processing or computation. According to one embodiment, as at least part of the data processing or computation, the processor 1620 may load a command or data received from another component (e.g., the sensor module 1676 or the communication module 1690) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), and an auxiliary processor 1623 (e.g., a graphics processing unit (GPU), an image signal processor (ISP), a sensor hub processor, or a communication processor (CP)) that is operable independently from, or in conjunction with, the main processor 1621. Additionally or alternatively, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display device 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 1623.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input device 1650 may receive a command or data to be used by other component (e.g., the processor 1620) of the electronic device 1601, from the outside (e.g., a user) of the electronic device 1601. The input device 1650 may include, for example, a microphone, a mouse, a keyboard, or a digital pen (e.g., a stylus pen).

The sound output device 1655 may output sound signals to the outside of the electronic device 1601. The sound output device 1655 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1660 may visually provide information to the outside (e.g., a user) of the electronic device 1601. The display device 1660 may include, for example, a display, a hologram device, or a projector and control circuitry to control a corresponding one of the display, hologram device, and projector. According to an embodiment, the display device 1660 may include touch circuitry adapted to detect a touch, or sensor circuitry (e.g., a pressure sensor) adapted to measure the intensity of force incurred by the touch.

The audio module 1670 may convert a sound into an electrical signal and vice versa. According to an embodiment, the audio module 1670 may obtain the sound via the input device 1650, or output the sound via the sound output device 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. According to an embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment, the connecting terminal 1678 may include, for example, an HDMI connector, a USB connector, an SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to one embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, Wi-Fi direct, or infrared data association (IrDA)) or the second network 1699 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The antenna module 1697 may transmit or receive a signal or power to or from the outside (e.g., the external electronic device) of the electronic device 1601. According to an embodiment, the antenna module 1697 may include an antenna including a radiating element composed of a conductive material or a conductive pattern formed in or on a substrate (e.g., printed circuit board (PCB)). According to an embodiment, the antenna module 1697 may include a plurality of antennas. In such a case, at least one antenna appropriate for a communication scheme used in the communication network, such as the first network 1698 or the second network 1699, may be selected, for example, by the communication module 1690 (e.g., the wireless communication module 1692) from the plurality of antennas. The signal or the power may then be transmitted or received between the communication module 1690 and the external electronic device via the selected at least one antenna. According to an embodiment, another component (e.g., a radio frequency integrated circuit (RFIC)) other than the radiating element may be additionally formed as part of the antenna module 1697.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. Each of the electronic devices 1602 and 1604 may be a device of a same type as, or a different type, from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a display panel including a first display area and a second display area, the first display area including first subpixels distributed at a first density and the second display area including second subpixels distributed at a second density lower than the first density, wherein a number of first subpixels to form a pixel disposed in the first display area is greater than a number of second subpixels to form a pixel disposed in the second display area;
   a camera sensor disposed under the second display area of the display panel, and configured to receive light through the second display area of the display panel; and
   a display driver integrated circuit (IC) associated with driving the display panel,
   wherein the display driver IC includes:
      a gamma generator configured to generate a first, a second, and a third gamma signals to first source lines connected to each of the first subpixels arranged in the first display area,
      an extra gamma generator configured to generate a fourth gamma signal to second source lines connected to each of the second subpixels arranged in the second display area,
      first amplifiers connected to the first source lines and supplying an amplified signal to the first display area and second amplifiers connected to the second source lines and supplying an amplified signal to the second display area, and
      first decoders connected to the first amplifiers and second decoders connected to the second amplifiers, and
   wherein the display driver IC is configured to:
      supply each of the first, second, and third gamma signals generated by the gamma generator to each of the first decoders when displaying a screen of the first display area, and
      supply each of the first, second, and third gamma signals generated by the gamma generator to each of the second decoders while supplying the fourth gamma signal generated by the extra gamma generator to the second decoders in common, when displaying a screen of the second display area.

2. The electronic device of claim 1, further comprising:
   a fingerprint sensor disposed under the second display area of the display panel.

3. The electronic device of claim 1, wherein the first display area is disposed to surround at least one surface of the second display area or at least a portion of a periphery of the second display area.

4. The electronic device of claim 1, wherein the fourth gamma signal includes a common gamma voltage signal of a same magnitude.

5. The electronic device of claim 1,
   wherein the gamma generator includes:
      a first gamma generator configured to supply a gamma signal to red first subpixels and blue first subpixels arranged in the first display area, and
      a second gamma generator configured to supply a gamma signal to green first subpixels arranged in the first display area, and
   wherein the extra gamma generator is disposed adjacent to the gamma generator and is configured to supply a gamma signal in common to red second subpixels, green second subpixels, and blue second subpixels arranged in the second display area.

6. The electronic device of claim 1,
wherein the gamma generator is disposed in a center of the display driver IC, and
wherein the extra gamma generator is disposed in a location in the display driver IC, the location corresponding to a location of a signal line for supplying a signal to the second display area.

7. The electronic device of claim 1, wherein the display driver IC alternately operates an odd-numbered gate line and an odd-numbered source line of the second display area and an even-numbered gate line and an even-numbered source line of the second display area.

8. The electronic device of claim 1, wherein the display driver IC further includes:
a plurality of multiplexers configured to:
multiplex some outputs of the gamma generator and an output of the extra gamma generator, and
supply the first, second, and third gamma signals of the gamma generator or the fourth gamma signal of the extra gamma generator to the first and second decoders under control.

9. The electronic device of claim 1, wherein a first magnitude of a source signal output of the first display area and a second magnitude of a source signal output of the second display area are different from each other.

10. The electronic device of claim 9, wherein a difference between the first magnitude and the second magnitude corresponds to a difference between a density of first subpixels of the first display area and a density of second subpixels of the second display area.

11. The electronic device of claim 1, wherein the display driver IC controls a magnitude of a source signal output of the second display area such that colors and luminances of a same content output to the first display area and the second display area are shown to be a same as or similar to each other.

12. A method performed by an electronic device including a display panel and display driver integrated circuit (IC), the display panel including a first display area and a second display area, the first display area including first subpixels distributed at a first density and the second display area including second subpixels distributed at a second density lower than the first density, and the display driver IC including a gamma generator configured to generate a first, a second, and a third gamma signals to first source lines connected to each of the first subpixels arranged in the first display area, an extra gamma generator configured to generate a fourth gamma signal to second source lines connected to each of the second subpixels arranged in the second display area, first amplifiers connected to the first source lines and supplying an amplified signal to the first display area and second amplifiers connected to the second source lines and supplying an amplified signal to the second display area, and first decoders connected to the first amplifiers and second decoders connected to the second amplifiers, the method comprising:
supplying each of the first, second, and third gamma signals generated by the gamma generator to each of the first decoders when displaying a screen of the first display area; and
supplying each of the first, second, and third gamma signals generated by the gamma generator to each of the second decoders while supplying a fourth gamma signal generated by the extra gamma generator to the second decoders in common, when displaying a screen of the second display area.

13. The method of claim 12, wherein the supplying of the fourth gamma signal comprises alternately supplying the fourth gamma signal to odd-numbered gate lines and odd-numbered source lines arranged in the second display area.

14. The method of claim 12, wherein the supplying of the fourth gamma signal comprises alternately supplying the fourth gamma signal to even-numbered gate lines and even-numbered source lines arranged in the second display area.

* * * * *